(12) United States Patent
Chang et al.

(10) Patent No.: US 11,041,110 B2
(45) Date of Patent: Jun. 22, 2021

(54) COMPOSITIONS OF AND METHODS FOR USING HYDRAULIC FRACTURING FLUID FOR PETROLEUM PRODUCTION

(71) Applicants: Saudi Arabian Oil Company, Dhahran (SA); Oil Chem Technologies, Sugar Land, TX (US)

(72) Inventors: Fakuen Frank Chang, Dhahran (SA); Paul D. Berger, Sugar Land, TX (US); Christie H. Lee, Sugar Land, TX (US)

(73) Assignees: SAUDI ARABIAN OIL COMPANY, Dhahran (SA); OIL CHEM TECHNOLOGIES, Sugar Land, TX (US)

( * ) Notice: Subject to any disclaimer, the term of this patent is extended or adjusted under 35 U.S.C. 154(b) by 0 days.

(21) Appl. No.: 16/814,434

(22) Filed: Mar. 10, 2020

(65) Prior Publication Data

US 2020/0208046 A1    Jul. 2, 2020

Related U.S. Application Data

(60) Division of application No. 15/800,999, filed on Nov. 1, 2017, now Pat. No. 10,619,089, which is a
(Continued)

(51) Int. Cl.
*C09K 8/64*    (2006.01)
*C09K 8/68*    (2006.01)
(Continued)

(52) U.S. Cl.
CPC ............... *C09K 8/64* (2013.01); *C09K 8/602* (2013.01); *C09K 8/68* (2013.01); *C09K 8/82* (2013.01);
(Continued)

(58) Field of Classification Search
CPC ......... C09K 8/80; C09K 8/602; E21B 43/267; E21B 43/26
See application file for complete search history.

(56) References Cited

U.S. PATENT DOCUMENTS 2,877,852 A   3/1959   Bashara
3,366,178 A   1/1968   Malone et al.
(Continued)

FOREIGN PATENT DOCUMENTS

CA    2708166 A1    6/2009
WO   2009079235 A2   6/2009

OTHER PUBLICATIONS

International Search Report and Written Opinion for related PCT application PCT/US2015/061087 dated Mar. 3, 2016.
(Continued)

*Primary Examiner* — Zakiya W Bates
(74) *Attorney, Agent, or Firm* — Bracewell LLP; Constance G. Rhebergen; Kevin R. Tamm

(57) ABSTRACT

A hydraulic fracturing fluid for use in oilfield applications, where hydraulic fracturing fluid includes a spherical bead-forming liquid composition, the spherical bead-forming liquid composition comprising a micellar forming surfactant, a bead-forming compound, a non-solids bearing liquid solvent, a pH control agent, and a curing agent.

19 Claims, 16 Drawing Sheets

Related U.S. Application Data continuation of application No. 15/175,618, filed on Jun. 7, 2016, now Pat. No. 9,828,543, which is a continuation-in-part of application No. 14/943,956, filed on Nov. 17, 2015, now Pat. No. 9,834,721.

(60) Provisional application No. 62/081,617, filed on Nov. 19, 2014.

(51) Int. Cl.

| | | |
|---|---|---|
| *E21B 43/267* | (2006.01) | |
| *E21B 43/26* | (2006.01) | |
| *C09K 8/60* | (2006.01) | |
| *C09K 8/86* | (2006.01) | |
| *C09K 8/88* | (2006.01) | |
| *C09K 8/82* | (2006.01) | |

(52) U.S. Cl.
CPC .............. *C09K 8/86* (2013.01); *C09K 8/88* (2013.01); *E21B 43/26* (2013.01); *E21B 43/267* (2013.01)

(56) References Cited

U.S. PATENT DOCUMENTS

| | | | |
|---|---|---|---|
| 3,747,677 | A | 7/1973 | Richardson |
| 4,016,931 | A | 4/1977 | Cryar, Jr. |
| 4,951,751 | A | 8/1990 | Jennings, Jr. |
| 5,199,491 | A | 4/1993 | Kutta et al. |
| 5,293,935 | A | 3/1994 | Arterbury et al. |
| 5,358,047 | A | 10/1994 | Himes et al. |
| 5,402,846 | A | 4/1995 | Jennings et al. |
| 6,059,034 | A | 5/2000 | Rickards et al. |
| 6,213,209 | B1 | 4/2001 | Nguyen et al. |
| 6,302,207 | B1 | 10/2001 | Nguyen et al. |
| 6,330,916 | B1 | 12/2001 | Rickards et al. |
| 6,684,951 | B2 | 2/2004 | Restarick et al. |
| 7,380,600 | B2 | 6/2008 | Willberg et al. |
| 7,407,010 | B2 | 8/2008 | Rickman et al. |
| 7,493,957 | B2 | 2/2009 | Nguyen et al. |
| 7,541,318 | B2 | 6/2009 | Weaver et al. |
| 7,644,761 | B1 | 1/2010 | Gu et al. |
| 7,703,531 | B2 | 4/2010 | Huang et al. |
| 7,810,562 | B2 | 10/2010 | Tu et al. |
| 7,931,089 | B2 | 4/2011 | Miller et al. |
| 8,006,759 | B1 | 8/2011 | Cochran, Jr. et al. |
| 8,196,659 | B2 | 6/2012 | Huang et al. |
| 8,505,628 | B2 | 8/2013 | Panga et al. |
| 8,662,172 | B2 | 3/2014 | Panga et al. |
| 8,916,506 | B2 | 12/2014 | Panga et al. |
| 9,260,935 | B2 | 2/2016 | Murphree et al. |
| 9,394,474 | B2 | 7/2016 | Brooks et al. |
| 9,828,542 | B2 * | 11/2017 | Moeller .............. C04B 35/5603 |
| 9,828,543 | B2 | 11/2017 | Chang et al. |
| 9,834,721 | B2 | 12/2017 | Chang et al. |
| 2002/0023752 | A1 | 2/2002 | Qu et al. |
| 2004/0084177 | A1 | 5/2004 | Wang et al. |
| 2004/0229756 | A1 | 11/2004 | Eoff et al. |
| 2005/0121192 | A1 | 6/2005 | Hailey, Jr. et al. |
| 2005/0197258 | A1 | 9/2005 | Nguyen |
| 2007/0039741 | A1 | 2/2007 | Hailey, Jr. |
| 2007/0111896 | A1 | 5/2007 | Knox et al. |
| 2009/0209439 | A1 | 8/2009 | Qiu et al. |
| 2010/0132944 | A1 | 6/2010 | Li et al. |
| 2012/0000641 | A1 | 1/2012 | Panga et al. |
| 2012/0325472 | A1 | 12/2012 | Litvinets et al. |
| 2013/0075090 | A1 | 3/2013 | Woiceshyn |
| 2013/0248172 | A1 | 9/2013 | Angeles Boza et al. |
| 2013/0248191 | A1 | 9/2013 | Nguyen |
| 2013/0277053 | A1 | 10/2013 | Yeh et al. |
| 2013/0317135 | A1 | 11/2013 | Vega |
| 2014/0041869 | A1 | 2/2014 | Weaver et al. |
| 2014/0131041 | A1 | 5/2014 | Liang et al. |
| 2014/0144629 | A1 | 5/2014 | Nguyen |
| 2014/0224493 | A1 | 8/2014 | Soliman et al. |
| 2014/0318777 | A1 | 10/2014 | Fontenelle et al. |
| 2014/0332214 | A1 | 11/2014 | Zhou et al. |
| 2015/0240612 | A1 | 8/2015 | Fu et al. |
| 2015/0308238 | A1 | 10/2015 | Langlais |
| 2016/0002998 | A1 | 1/2016 | Wang |
| 2016/0003015 | A1 | 1/2016 | Chang |
| 2016/0137910 | A1 | 5/2016 | Chang et al. |
| 2016/0289543 | A1 | 10/2016 | Chang et al. |
| 2019/0078420 | A1 | 3/2019 | Han et al. |

OTHER PUBLICATIONS

International Search Report and Written Opinion for Related PCT Application PCT/US2017/036367 dated Aug. 3, 2017 (pp. 1-9).

The International Search Report and Written Opinion for related PCT application PCT/US2018/038908 dated Sep. 6, 2018.

International Preliminary Report on Patenability and Written Opinion for related PCT application PCT/US2015/061087 dated May 23, 2017 (pp. 1-11).

\* cited by examiner

COMPOSITIONS OF AND METHODS FOR USING HYDRAULIC FRACTURING FLUID FOR PETROLEUM PRODUCTION

PRIORITY CLAIM

This application is a divisional application of and claims priority to and the benefit of U.S. patent application Ser. No. 15/800,999, filed on Nov. 1, 2017, which itself is a continuation application of and claims priority to and the benefit of U.S. patent application Ser. No. 15/175,618, filed on Jun. 7, 2016 and issued as U.S. Pat. No. 9,828,543, which is a continuation-in-part application of and claims priority to and the benefit of U.S. patent application Ser. No. 14/943,956, filed Nov. 17, 2015 and issued as U.S. Pat. No. 9,834,721, which claims priority to and the benefit of U.S. Provisional Patent Application No. 62/081,617, filed Nov. 19, 2014, the entire disclosures of which are expressly incorporated by reference here.

TECHNICAL FIELD

The present disclosure relates to a hydraulic fracturing fluid for oil field applications. More specifically, the present disclosure relates to a hydraulic fracturing fluid containing a spherical bead-forming liquid composition for forming in-situ spherical beads for improved oil and gas recovery.

BACKGROUND

Hydraulic fracturing is a process used to increase the permeability of a hydrocarbon-bearing reservoir in order to increase the flow of oil and gas to the surface. While effective, hydraulic fracturing operations are resource intensive. For example, for hydraulic fracturing operations in a shale gas reservoir, each well requires an average of 400 tanker trucks to carry water and supplies to and from the fracturing site; requiring at times 8 million gallons of water to complete each fracturing stage, with each well requiring multiple fracturing stages. The water is mixed with sand and chemicals to create the fracturing fluid. In addition, approximately 40,000 gallons of chemicals are used per fracturing job. By some estimates, there are 500,000 active gas wells in the United States requiring approximately 72 trillion gallons of water. The source of water, the leak off of the fracturing water into the reservoir, and the treatment of recovered water have become serious issues with economic and environmental concerns.

One of the components in a hydraulic fracturing fluid is the proppant component. Proppants are used in the fracturing process to keep fractures open and permeable to the flow of hydrocarbons, including oil and gas, after the external pressure of the hydraulic fracturing fluid is withdrawn. Traditional proppants include solids comprising one or more of sand, geopolymers, ceramics, resin coated sand, and glass beads. The hydraulic fracturing fluid used to carry and place the proppant in the fracture generally contains water, polymer, crosslinker, fluid loss additives, flow back additives, surfactants, clay stabilizers, proppant, and gel breaker. The polymer is used to provide viscosity and keep the proppants suspended until they have reached their desired location in the fracture. The breakers are used to reduce the polymer viscosity, allowing the particles to settle and the liquid portion of the fracturing fluid to be returned to the surface when the external pressure is removed and the overburden pressure partially closes the fracture. The proppants remain in the fracture and form permeability channels to increase the oil or gas production.

SUMMARY

The present disclosure relates to compositions and methods for fracturing a reservoir. More specifically, the disclosure relates to compositions and methods for fracturing a reservoir and in-situ proppant generation using polymeric materials. In some embodiments, an introduced hydraulic fracturing fluid, introduced by injection or other suitable means, is converted into a highly permeable proppant pack in-situ. Since the fracturing fluid itself forms the proppant, it can penetrate the entire fracture length and height within a complex fracture network, maximizing the effective fracture area and stimulated reservoir volume. The rendered particle sizes can be significantly larger than conventional proppants without the concern of screen-out. The in-situ formed proppants have strength sufficient to resist fracture closure stress. In some embodiments, no polymer is required to suspend the proppant; therefore no gel residue is left to damage fracture conductivity.

The present disclosure provides a hydraulic fracturing fluid for use in oilfield applications, and the hydraulic fracturing fluid includes a spherical bead-forming liquid composition. The spherical bead-forming liquid composition is comprised of a primary liquid precursor and a secondary liquid precursor. The primary liquid precursor optionally includes any one of or any combination of a micellar forming surfactant, a bead-forming compound, one or more curing agents, and a non-solids bearing liquid solvent. The secondary liquid precursor optionally comprises any one of or any combination of a non-solids bearing liquid solvent, a curing agent, a co-curing agent, a pH control agent, and an anti-foaming agent. In some embodiments, the non-solids bearing liquid solvent of the primary liquid precursor should be immiscible with the non-solids bearing liquid solvent in the secondary liquid precursor. In some embodiments, the primary liquid precursor and secondary liquid precursor form an emulsion upon their combination.

In some embodiments, the primary liquid precursor optionally includes any one of or any combination of one or more bead-forming compounds, optionally one or more micellar forming surfactants, optionally one or more curing agents, and optionally one or more non-solids bearing liquid solvents. The secondary liquid precursor optionally comprises any one of or any combination of a non-solids bearing liquid solvent, one or more curing agents, optionally one or more micellar forming surfactants, optionally one or more co-curing agents, optionally one or more pH control agents, and optionally one or more anti-foaming agents. In some embodiments, a non-solids bearing liquid solvent of the primary liquid precursor should be immiscible with a non-solids bearing liquid solvent in the secondary liquid precursor. In some embodiments, the primary liquid precursor and secondary liquid precursor form an emulsion upon their combination.

In some embodiments, in situ bead formation takes place after the combination of a primary liquid precursor A and a secondary liquid precursor B to create a bead-forming composition. In some embodiments the primary liquid precursor A and the secondary liquid precursor B are mixed in situ to form the bead-forming composition. In some embodiments, the bead-forming composition includes a bead-forming compound from primary liquid precursor A, a curing agent from either or both of primary liquid precursor A and secondary liquid precursor B, sea water from secondary liquid precursor B, micellar forming surfactant from either or both of primary liquid precursor A and secondary liquid precursor B, non-solids bearing liquid solvent from secondary liquid precursor B (optionally from primary liquid precursor A in addition to from secondary liquid precursor B), optionally an anti-foaming agent from either or both of primary liquid precursor A and secondary liquid precursor B, a pH control agent from secondary liquid precursor B (and optionally from primary liquid precursor A in addition to from secondary liquid precursor B), optionally a co-curing agent, from either or both of primary liquid precursor A and secondary liquid precursor B, and optionally a retarder, from either or both of primary liquid precursor A and secondary liquid precursor B.

The co-curing agent is optional in most cases. It can be used to modify the curing properties such as time to form beads to either increase or decrease the onset of bead formation. This is useful to ensure the beads don't form prematurely before reaching the target area of the fracture or take too long to form.

In some embodiments, the primary liquid precursor further comprises an anti-foaming agent. In other embodiments, the primary liquid precursor further comprises a pH control agent. Still in other embodiments, the micellar forming surfactant is selected from the group including, but not limited to, anionic surfactants, cationic surfactants, non-ionic surfactants, betaines, amphoteric surfactants and combinations thereof. In some embodiments, the bead-forming compound is selected from the group including, but not limited to, bis-phenol A diglycidyl ether, bis-phenol F diglycidyl ether, cycloaliphatic epoxides, glycidyl ethers, poly glycidyl ethers, novalac resins, polyurethane resins, acrylic resin, phenol-formaldehyde resin, epoxy functional resins, aliphatic epoxides, anhydrides, glycidyl amine epoxide, and combinations thereof.

Still in other embodiments, the non-solids bearing liquid solvent is selected from the group including, but not limited to, water, brine containing mono and polyvalent salt, sea water, mineral oil, kerosene, diesel, crude oil, petroleum condensate, low molecular weight alcohols, fatty alcohols, low molecular weight alcohol ethers, benzyl alcohol, and benzyl alcohol ethers, ethyl carbitol ether, γ-butyrolactone, phenol alkoxylates, alkylphenol alkoxylates, and combinations thereof.

In certain embodiments, the pH control agent is selected from the group including, but not limited to, hydrochloric acid, sulfuric acid, phosphoric acid, sodium hydroxide, potassium hydroxide, sodium carbonate, potassium carbonate, potassium phosphate, sodium silicate, potassium silicate, sodium aluminate, organic acids, and combinations thereof. In some embodiments, the curing agent is selected from the group including, but not limited to, Lewis acids, tertiary amines, mono ethanol amine, benzyl dimethylamine, 1,4-diaza-bicylo [2,2,2] octane, 1,8-diazabicylo [5,4,0] undec-7ene, cycloaliphatic amines, alkyl heterocyclic amines, polyalkyl heterocyclic polyamine, alkyl heterocyclic polyamines, amidoamines, aliphatic amines, aromatic amines, isophorone, isophorone diamine, polyamides, boron tri-fluoride derivatives, functional resins, imidazoles, imidazolines, mercaptans, sulfide, hydrazides, amides and their derivatives.

Still in yet other embodiments, the co-curing agent is selected from the group including, but not limited to, water, fatty acids, such as oleic acid, tall oil fatty acid, ricinoleic acid, benzoic acid, salicylic acid, stearic acid as well as alkoxylated alcohols, dicarboxylic acids, carboxylic acids, imidazolines, dicyandiamides, ureas, imidazoles, thiols, aliphatic polyamines, cycloaliphatic polyamides, cycloaliphatic dicarboxylic acid anhydrides, imidazoline salts, dicyandamides, phenols and alkylphenol s.

In certain embodiments, the spherical bead-forming liquid composition is a non-solids bearing homogenous liquid. In other embodiments, the spherical bead-forming liquid composition has a liquid viscosity from about 20 centipoise (cp) to about 80 cp.

Additionally disclosed is a method of fracturing a reservoir with a spherical bead-forming liquid composition that forms a hydraulic fracturing fluid that generates fractures in the reservoir, and the method includes the step of mixing a primary liquid precursor and a secondary liquid precursor to form the spherical bead-forming liquid composition. The primary liquid precursor includes any one of or any combination of one or more bead-forming compounds, optionally one or more micellar forming surfactants, optionally one or more curing agents, and optionally one or more non-solids bearing liquid solvents. The secondary liquid precursor includes any one of or any combination of one or more non-solids bearing liquid solvents, optionally one or more curing agents, optionally one or more co-curing agents, and optionally one or more pH control agents. The method further includes the steps of pumping the spherical bead-forming liquid composition into an injection well in the reservoir at an external pressure greater than a pressure to generate fractures in the reservoir; allowing the spherical bead-forming liquid composition to migrate into the fractures of the reservoir; and allowing the primary liquid precursor and secondary liquid precursor to react to form in-situ spherical beads, the in-situ spherical beads are operable to keep the fractures open after the external pressure is released.

In some embodiments, the method further comprises the step of adding an anti-foaming agent to the primary liquid precursor. In some embodiments, the method further includes the step of adding a pH control agent to the primary liquid precursor. Still in other embodiments, the micellar forming surfactant is selected from the group including, but not limited to, anionic surfactants, cationic surfactants, non-ionic surfactants, betaines, amphoteric surfactants and combinations thereof. In other embodiments, the bead-forming compound is selected from the group including, but not limited to, bis-phenol A diglycidyl ether, bis-phenol F diglycidyl ether, cycloaliphatic epoxides, glycidyl ethers, poly glycidyl ethers, novalac resins, polyurethane resins, acrylic resin, phenol-formaldehyde resin, epoxy functional resins, and combinations thereof.

In some embodiments of the method, the non-solids bearing liquid solvent is selected from the group including, but not limited to, water, brine containing mono and polyvalent salt, sea water, mineral oil, kerosene, diesel, crude oil, petroleum condensate, low molecular weight alcohols, fatty alcohols, low molecular weight alcohol ethers, benzyl alcohol, and benzyl alcohol ethers, ethyl carbitol ether, γ-butyrolactone, phenol alkoxylates, alkylphenol alkoxylates, and combinations thereof.

Still in other embodiments of the method, the pH control agent is selected from the group including, but not limited to, hydrochloric acid, sulfuric acid, phosphoric acid, sodium hydroxide, potassium hydroxide, sodium carbonate, potassium carbonate, potassium phosphate, sodium silicate, sodium aluminate, potassium silicate, organic acids, and combinations thereof. In certain embodiments, the curing agent is selected from the group including, but not limited to, Lewis acids, tertiary amines, mono ethanol amine, benzyl dimethylamine, 1,4-diaza-bicylo [2,2,2] octane, 1,8-diazabicylo [5,4,0] undec-7ene, cycloaliphatic amines, alkyl heterocyclic amines, polyalkyl heterocyclic polyamine, alkyl heterocyclic polyamines, amidoamines, aliphatic amines, aromatic amines, isophorone, isophorone diamine, polyamides, boron tri-fluoride derivatives, functional resins, imidazoles, imidazolines, mercaptans, sulfide, hydrazides, amides and their derivatives.

Still in other embodiments, the co-curing agent is selected from the group including, but not limited to, fatty acids, such as oleic acid, tall oil fatty acid, ricinoleic acid, benzoic acid, salicylic acid, stearic acid as well as alkoxylated alcohols, dicarboxylic acids, carboxylic acids, imidazolines, dicyandiamides, ureas, imidazoles, thiols, aliphatic polyamines, cycloaliphatic polyamides, cycloaliphatic dicarboxylic acid anhydrides, imidazoline salts, dicyandiamides, phenols and alkylphenols.

In some embodiments of the method, the spherical bead-forming liquid composition is a non-solids bearing homogenous liquid. In some embodiments of the method, the spherical bead-forming liquid composition has a liquid viscosity from about 20 centipoise (cp) to about 80 cp.

Various additives may be added to the hydraulic fracturing fluid before it is introduced, by injection or otherwise, into the reservoir. These include but are not limited to: retarders, corrosion inhibitors, scale inhibitors, clay stabilizers, biocides, fluid loss additives, and friction reducers.

BRIEF DESCRIPTION OF THE DRAWINGS

These and other features, aspects, and advantages of the disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
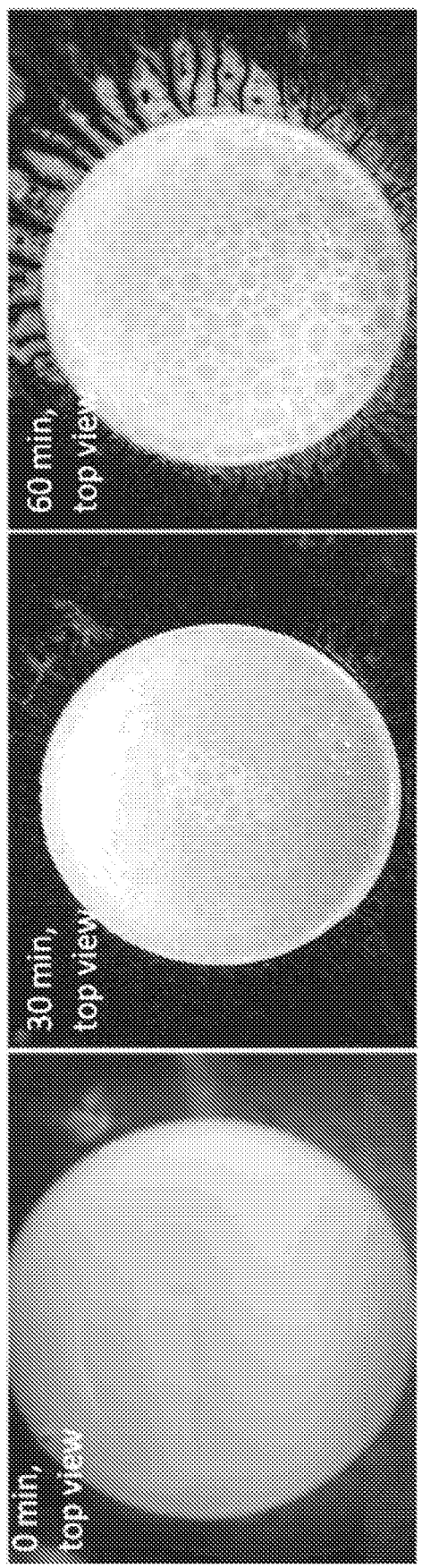
FIG. 1 is a top view pictorial representation of the progress of spherical bead formation at time zero, 30 minutes, and 60 minutes.

While the disclosure will be described in connection with several embodiments, it will be understood that it is not intended to limit the disclosure to those embodiments. On the contrary, it is intended to cover all the alternatives, modifications, and equivalents as may be included within the spirit and scope of the disclosure defined by the appended claims.

The present disclosure describes a hydraulic fracturing fluid that includes a spherical bead-forming liquid composition. The hydraulic fracturing fluid is introduced, by injection or other suitable method, into a subterranean reservoir under sufficient external pressure generating fractures in the reservoir. The hydraulic fracturing fluid is allowed to migrate into the fractures in the reservoir. The spherical bead-forming liquid composition reacts in-situ to form in-situ spherical beads. The in-situ spherical beads act as proppants in the fractures in the reservoir to prevent the fractures from closing when the external pressure is removed.

The spherical bead-forming liquid composition is composed of a mixture of a primary liquid precursor and a secondary liquid precursor. The mixture of the primary liquid precursor and the secondary liquid precursor are mixed before or upon introduction, by injection or otherwise, into the well, also referred to as a reservoir or formation, to form a spherical bead-forming liquid composition. The order of addition of components during mixing may be adding the primary liquid precursor to the secondary liquid precursor or adding the secondary liquid precursor to the primary liquid precursor.

In certain embodiments, the hydraulic fracturing fluid is a non-solids containing hydraulic fluid containing liquid proppant precursors, and this provides many advantages over conventional formulations and processes. Minimal abrasion on pumping equipment is experienced since no solids are present in the injection fluid to be introduced to a hydrocarbon-bearing reservoir as compared to conventional solid-proppant-laden fracturing fluids. The hydraulic fluid can more effectively penetrate deeply into the formation through complex fracture networks, forming in-situ proppants to allow entire induced fractures to contribute to oil and gas production. The absence of solids also eliminates the possibility of bridging at the head of microfractures and convoluting pathways within the hydrocarbon-bearing formation that would prevent further penetration of the hydraulic fluid. The absence of solids prior to bead formation also prevents screen out near the wellbore which is a concern when using solid proppants. The time required for the bead formation, the size of the beads, and other properties can be adjusted by adjusting components and component concentrations in the primary and secondary liquid precursor formulations to achieve the optimized fracturing design.

The in-situ formed spherical beads can be significantly larger than conventional proppant particles. This allows enhancement of fracture conductivity, creating flow channels to enhance conductivity and increase hydrocarbon production. In carbonate reservoirs, the in-situ proppants can effectively overcome the short etching pattern suffered during acid fracturing for rapid acid spending rate; they also eliminate the concern of corrosion caused by a large volume of acid injection.

The formed beads exhibit elastic mechanical behavior under loads, so the proppant flow back can be effectively controlled. The stiffness of the in-situ set proppants increases as the closure stress increases. The elasticity or the rigidness of the mechanical behavior of the beads can be designed and controlled by the primary and secondary liquid precursors to achieve the properties needed for a given application. The beads remain elastic, and therefore substantially no crushing is experienced, as there is by conventional brittle proppants, which generate fines (shown in FIGS. 14-16). Without being bound by any theory or explanation, this unique characteristic is one believed to help sustain the fractures over long durations.

In some embodiments, the primary liquid precursor optionally includes any one of or any combination of one or more micellar forming surfactants, one or more primary bead-forming compounds, one or more curing agents, and one or more liquid non-solids bearing solvents (also called liquid solvent carrier). The primary liquid precursor optionally includes one or more anti-foaming agents, optionally one or more pH control agents, and optionally one or more retarders.

In other embodiments, the primary liquid precursor includes any one of or any combination of one or more bead-forming compounds, optionally one or more micellar forming surfactants, optionally one or more curing agents, and optionally one or more non-solids bearing liquid solvents. The secondary liquid precursor comprises any one of or any combination of a non-solids bearing liquid solvent, optionally one or more curing agents, optionally one or more micellar forming surfactants, optionally one or more co-curing agents, optionally one or more pH control agents, and optionally one or more anti-foaming agents. In some embodiments, a non-solids bearing liquid solvent of the primary liquid precursor is immiscible with a non-solids bearing liquid solvent in the secondary liquid precursor. In some embodiments, the primary liquid precursor and secondary liquid precursor for an emulsion upon their combination.

The components of the primary liquid precursor are chosen to be compatible in the primary liquid precursor and to be capable for creating an environment from which the in-situ spherical beads can form.

Any micellar forming surfactant that can suitably alter the wettability of the in-situ spherical beads can be used. In addition, any surfactant that can suitably form micelles can be used. The wettability of the in-situ spherical beads can be varied from water wet, oil wet or partially oil/water wet by the micellar forming surfactant. Certain example micellar forming surfactants include anionic surfactants, cationic surfactants, nonionic surfactants, betaines, and amphoteric surfactants.

Certain example bead-forming compounds include bis-phenol A diglycidyl ether, bis-phenol F diglycidyl ether, Epon® 828, Epon® 871, Degussa F126®, cylcloaliphatic epoxides, glycidyl ethers, poly glycidyl ethers, Cardolite NC 547®, DER 732®, DER 736®, MAX CLR™ A, novalac resins, polyurethane resins, acrylic resin, phenol-formaldehyde resin, epoxy functional resins, aliphatic epoxides, anhydrides, and glycidyl amine epoxide.

Certain example liquid non-solids bearing solvents include aqueous solvents and non-aqueous solvents. Certain example aqueous solvents include, but are not limited to, water, water containing one or more of mono and polyvalent cation salts, sea water, produced brine, and synthetic brine. Certain example non-aqueous solvents include, but are not limited to, mineral oil, kerosene, diesel, crude oil, petroleum condensate, fatty alcohols, low molecular weight alcohols, esters, low molecular weight alcohol ethers, benzyl alcohol, benzyl alcohol ethers, ethyl carbitol ether, γ-butyrolactone, phenol alkoxylates, alkylphenol alkoxylates, fatty acids and combinations thereof. Low molecular weight alcohols as used throughout the disclosure refer to those alcohols containing a linear, branched, saturated or unsaturated primary carbon chain containing from one to eight carbons.

Certain example alcohols include, but are not limited to, methanol, ethanol, n-propanol, iso-propanol, butanol, iso-butanol, 2-ethyl hexanol, cyclohexanol, benzyl alcohol and like. Certain example ethers include but are not limited to ethylene glycol monobutyl ether, alkoxylated benzyl alcohol, alkoxylated hexanol, and alkoxylated butanol. In at least one embodiment of the present disclosure, the liquid non-solids bearing solvent is an organic solvent. In at least one embodiment of the disclosure, the liquid non-solids bearing solvent is incorporated into the matrix of the in-situ spherical bead.

The phrase "fatty alcohols" as used throughout the disclosure refers to those alcohols containing about $C_8$ to about $C_{30}$ linear or branched, saturated or unsaturated carbon chains. Certain example fatty alcohols include but are not limited to coconut fatty alcohol, palmityl alcohol, oleyl alcohol, stearyl alcohol, isostearyl alcohol, erucyl alcohol, benzyl alcohol, behenyl alcohol, nervonyl alcohol, lauryl alcohol, myristyl alcohol, cetyl alcohol, and mixtures thereof.

The antifoaming agent may be any of a number of products that have been found to reduce foam during surface or downhole applications, including silicone and non-silicone antifoams. In certain embodiments, the formation of the proppant beads in situ generates substantially no foam.

Certain example pH control agents include, but are not limited to, hydrochloric acid, hydrofluoric acid, sulfuric acid, phosphoric acid, sodium hydroxide, sodium aluminate, potassium hydroxide, sodium carbonate, potassium carbonate, potassium phosphate, sodium silicate, sodium aluminate, potassium silicate and organic acids or bases.

Certain example retarders include, but are not limited to, tertiary amines, mono-functional amines, hindered polyfunctional amines, diluents, metal complexes, one or more of mono and polyvalent alkali salts, and may be added as is known in the art. Retarders are one component used to control the pot life and rate of bead formation. In some embodiments, the micellar forming surfactant must be present in at least one of a primary or secondary liquid precursor. In some embodiments, the micellar forming surfactant can be present in both the primary and secondary liquid precursor.

The secondary liquid precursor includes one or more liquids. The secondary liquid may also include one or more pH control agents as defined previously. It may also include one or more electrolytes. The secondary liquid precursor optionally includes one or more co-curing agents, and optionally one or more retarders.

Certain example curing agents include, but are not limited to, Lewis acids, tertiary amines, mono ethanol amine, benzyl dimethylamine, 1,4-diaza-bicylo[2,2,2] octane, 1,8-diazabicylo[5,4,0] undec-7ene, cycloaliphatic amines, alkyl heterocyclic amines, polyalkyl heterocyclic polyamines, alkyl heterocyclic polyamines, amidoamines, aliphatic amines, aromatic amines, isophorone, isophorone diamine, polyamides, boron tri-fluoride derivatives, functional resins, imidazoles, imidazolines, mercaptans, sulfide, hydrazides, amides and their derivatives. In some embodiments, the curing agent must be present in at least one of a primary or secondary liquid precursor. In some embodiments, one or more curing agents can be present in both a primary and secondary liquid precursor.

Certain example co-curing agents include, but are not limited to, water, fatty acids, such as oleic acid, tall oil fatty acid, ricinoleic acid, benzoic acid, salicylic acid, stearic acid as well as alkoxylated alcohols, dicarboxylic acids, carboxylic acids, imidazolines, dicyandiamides, ureas, imidazoles, thiols, aliphatic polyamines, cycloaliphatic polyamides, cycloaliphatic dicarboxylic acid anhydrides, imidazoline salts, dicyandiamides, phenols and alkylphenols.

Precursors that yield curing agents or co-curing agents upon contact with water or other activators or upon raising the temperature can be used. These include but are not limited to ketamines such as the reaction product of isophorone and methyl isobutyl ketone or the reaction product of diamines reacted with various aldehydes.

Certain examples of electrolytes include but are not limited to mono-, di-, or tri-valent salts such as sodium chloride, sodium phosphate, sodium silicate, sodium aluminate, sodium sulfate, calcium chloride, calcium phosphate, calcium silicate, calcium aluminate, calcium sulfate, magnesium chloride, magnesium phosphate, magnesium, magnesium aluminate, magnesium sulfate, potassium chloride, potassium phosphate, potassium silicate, potassium aluminate, potassium sulfate, and mixtures thereof.

The spherical bead-forming liquid composition can optionally include liquid soluble cross linker, initiator, or diluents.

In some embodiments, the spherical bead-forming liquid composition is a homogenous liquid. In some embodiments, the liquid composition has a liquid viscosity from about 20 centipoise (cp) to about 80 cp, or from about 30 cp to about 60 cp, or about 40 cp to about 50 cp, or about 40 cp. The viscosity can be adjusted by mixing the precursors in different base fluids, such as, for example, one or more of brine, sea water, oil, and other organic liquids. The density of the liquid mixture is also a function of the base fluid. The viscous liquid serves as the fracturing fluid as well as proppants once it enters the fracture and becomes static. The extent of mixing of the formulation and its residence time as it propagates through the fracture results in the formation of spherical beads.

In a method of using the spherical bead-forming liquid composition, the hydraulic fracturing fluid of the present disclosure is pumped into the reservoir at an external pressure. The external pressure is greater than the pressure needed to fracture the reservoir. The hydraulic fracturing fluid of the present disclosure is pumped into the well where the components in the primary liquid precursor and the components in the secondary liquid precursor are allowed to react and form in-situ spherical beads. The in-situ spherical bead technology can be used with different fracturing pumping techniques, such as flow channel techniques, multi-stage fracturing, matrix fracturing, and others as known to the fracturing industry. The technology can also be used as a water shut off agent, permeability modifier, or sand control agent. In at least one embodiment, where the in-situ spherical beads act as permeability modifiers, the in-situ spherical beads form in the fractures generated by pumping in the hydraulic fracturing fluid and hold open the fractures against the overburden pressure. After the hydraulic fracturing fluid is no longer pumped into the reservoir, the pressure in the wellbore is reduced. The in-situ spherical beads prevent the fractures from closing and allow hydrocarbons to flow from the reservoir to the wellbore.

In some embodiments, the fracturing fluid is solids free and contains chemical precursors that will set into spherical particle beads deep within the reservoir to serve as proppants which keep the flow channels open and allow oil and gas to be easily transported into a well. The in-situ formed propping agent can be significantly larger than conventional proppants without screening out effects. The larger proppant also creates much higher fracture conductivity. The size of the spherical beads is controlled, in part, by the liquid precursor formulations and their residence time within the fractures. The size of the spherical beads ranges from about 0.5 mm to about 5 mm in some embodiments, and the size of the beads is also controlled in part by the reservoir temperature and pressure, the shear rate during pumping, contaminants in the reservoir, and fluid leak off. Longer pumping times and longer setting times will result in smaller spherical beads, which can support the micro-fractures further from the wellbore. Larger spherical beads will form and remain in the main fracture and near the wellbore. Most of the precursors present in the injected fracturing fluid will be consumed while setting into the beads, and therefore there is very little fluid to flow back to the surface after the fracturing treatment. This can significantly reduce the time for the onset of production from a well and can reduce the produced fluid handling.

Another feature of in-situ proppants of the present disclosure is that embodiments can be formulated into a fluid system that is basically water free by choosing an organic solvent such as one or more of crude oil, alcohols, esters, and fatty acids for main components to be mixed in. Within the hydrocarbon-bearing formation, clay swelling and fines migration issues can be minimized. In regions that fresh water availability is limited, such as offshore environments, the fluid can be made up with seawater or produced water to relieve the burden on the environment and transportation logistics.

The extent of mixing of the spherical bead-forming liquid composition and its residence time as it propagates through the fracture results in the formation of spherical beads. The diameter and the hardness of the spherical beads can be controlled by the formulations and pot life of the primary liquid precursor and secondary liquid precursor. Pot life refers to the time between when the spherical bead-forming liquid composition is pumped, injected, or otherwise introduced into the reservoir and the point in time at which the spherical bead-forming liquid composition reaches a viscosity at which the spherical liquid composition is unpumpable. The components in the primary liquid precursor and secondary liquid precursor affect the pot life of the spherical bead-forming liquid composition. Small diameter spherical beads are preferred for micro-fractures at the head of the fracture and progressively larger diameter spherical beads within the fracture and closer to the well borehole (see FIG. 7).

The pot life required to commence forming in-situ spherical beads can be varied by varying the precursor formulations, for example adding retarders and accelerators. Certain example accelerators include, but are not limited to, acids, bases, fatty acids, amines, amides, and alcohols. The diameter and the hardness of the beads can be controlled by the reaction time between solid-forming precursors. According to the formation properties, the fracturing treatment could be designed such that small diameter beads are formed in the tip of fracture or in narrow fractures and progressively larger diameter beads are formed at the tail of fracture near a wellbore. A viscous pad can be pumped ahead of the in-situ proppant fluid if necessary to create fracture geometry and to provide leak-off control.

Once placed in the fracture, the liquid mixture in the fracture reacts internally before the fracture closes to convert into spherical solid beads, which are mechanically strong enough to keep the fracture open (discussed further as follows in the Examples). Once set, the proppant pack is highly conductive for flow of the reservoir fluid to be produced through such high porosity media. FIG. 1 shows an example of the in-situ proppant formation process through time at 150° F. In general, the beads can be formed in less than 15 minutes and up to more than 8 hours after the two precursors are mixed. In FIG. 1, the photo on the left shows a homogeneous liquid containing the precursor liquids of the settable solid. The middle photo shows the onset of the solid forming when the fluid was set for 30 minutes at 150° F., after mixing of the precursors. The photo on the right shows the growth of the beads after sitting stagnant for 60 minutes.

Certain embodiments of the present disclosure use a primary liquid precursor and a secondary liquid precursor that are solids-free to create in-situ spherical beads in the fractures under hydraulic pressure within a reservoir and support the fracture to increase the permeability of the reservoir. The in-situ spherical beads replace traditional proppants by being operable to keep the fractures open after the hydraulic fracturing and allow one or both of oil and gas to flow through the spaces between each bead. The present disclosure minimizes the water needed for the hydraulic fracturing and the disposal of the flow back water after fracturing. The disclosure also eliminates the need for solid proppants, polymers, breakers and other additives commonly employed during conventional hydraulic fracturing.

One embodiment of the disclosure is the in-situ formation of in-situ spherical beads from a spherical bead-forming liquid composition, where the spherical bead-forming liquid composition was used as the hydraulic fracturing fluid to fracture the hydrocarbon containing reservoir and improve the recovery of hydrocarbons. In at least one embodiment, the secondary liquid precursor can be added simultaneously along with the primary liquid precursor. In at least one embodiment of the disclosure, the secondary liquid precursor can be added sequentially after the primary liquid precursor has been added to the reservoir through various mechanical means known in the art.

The spherical bead-forming liquid composition reacts after placement in the reservoir to form the in-situ spherical beads. Each of the components described as present in the primary liquid precursor and secondary liquid precursor can be added separately, but for handling and logistics purposes, the ingredients can be divided into primary liquid precursor and secondary liquid precursor and introduced to the reservoir in the field in the form of the spherical bead-forming liquid composition.

The time required for the in-situ spherical beads to form, also referred to as the pot life, the size of the in-situ spherical beads, the distribution of sizes, and the strength of the in-situ spherical beads can be controlled by the composition of the primary liquid precursor and secondary liquid precursor, such as the type and concentration of the micellar forming surfactant, the liquid non-solids bearing solvent, the bead-forming compound, the mono, di and poly cations dissolved in the liquid non-solids bearing solvent, the ratio of the primary liquid precursor and secondary liquid precursor, the shear energy, the temperature, the pressure, the reservoir environment and the pH.

Spherical beads can be generated having a diameter in the range from about 0.1 millimeters (mm) to about 30 mm, alternately in the range from about 0.1 mm to about 1 mm, alternately in the range from about 1 mm to about 10 mm, alternately in the range from about 10 mm to about 15 mm, alternately in the range from about 15 mm to about 20 mm, alternately in the range from about 20 mm to about 25 mm, and alternately from about 25 mm to about 30 mm. In at least one embodiment of the disclosure, the size of the in-situ spherical beads is affected by the composition of the spherical bead-forming liquid composition. In at least one embodiment of the disclosure, the rheology of the spherical bead-forming liquid composition can be fine-tuned based on the components of the primary liquid precursor and the secondary liquid precursor. FIG. 1 shows the progress of spherical bead formation with time, and FIG. 4 shows the final spherical beads that can be made by varying the primary liquid precursor and secondary liquid precursor.

Figure 4:
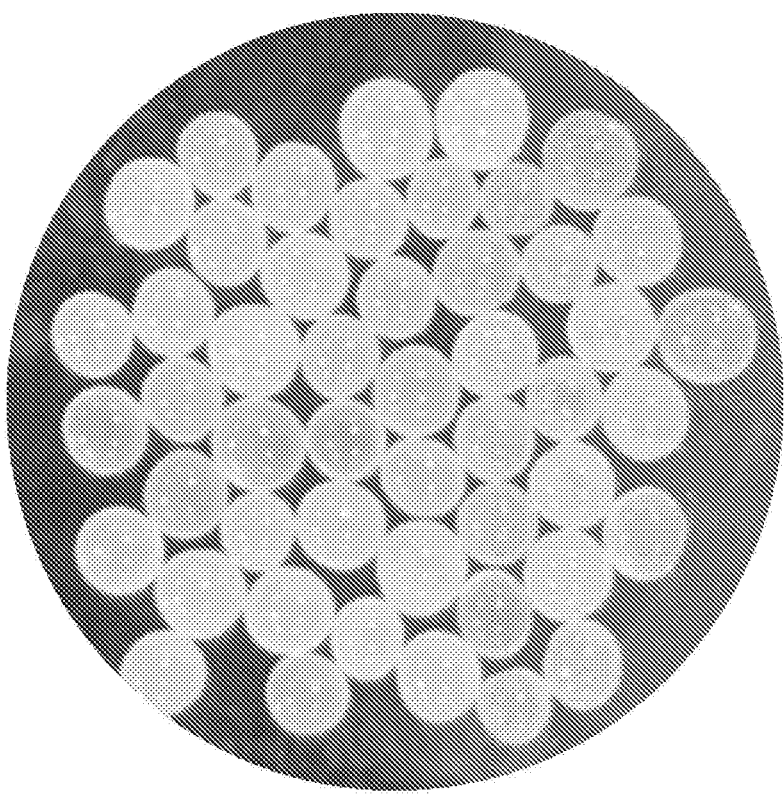
FIG. 4 is a pictorial representation of the spherical beads formed in Example 3.

Referring now to FIG. 4, the physical chemistry of the bead forming process leads to good sphericity of the beads. The good sphericity and large particle size help render highly uniform packing in the fracture to allow for the greatest fracture conductivity. FIG. 4 shows the sphericity of the in-situ formed proppant beads.

In an alternate embodiment, the in-situ spherical beads can be used to modify the permeability of the reservoir formation and allow for spaces between each in-situ spherical bead for fluid to flow. Because the in-situ spherical beads are spherical or substantially spherical in shape and in size, they will pack in the fracture to allow for the greatest amount of porosity between the beads. This is in contrast to conventional particles of irregular shapes and wide distribution in size that will pack much more tightly yielding lower permeabilities (for example, sand). Embodiments are designed to give in-situ spherical beads that are strong enough to withstand overburden pressure and prop open fractures formed during hydraulic fracturing and acidizing.

In another embodiment, processes and compositions can be fine-tuned to alter the surface properties of the beads to encourage the flow properties of the oil and gas in the reservoir. In some embodiments, the spherical beads are substantially uniform in size and shape. In some embodiments, the beads are substantially different in size and shape.

In another embodiment, the spherical beads can be used to consolidate and contain the unconsolidated sand in the near wellbore area.

In at least one embodiment, the spherical bead-forming liquid composition is in the absence of solid nucleating agent to generate the spherical beads. In at least one embodiment, only free-flowing, non-abrasive liquid is introduced into the reservoir avoiding abrasion to the pumping equipment.

In at least one embodiment, the spherical bead-forming liquid composition is in the absence of conventional fracturing fluid additives. Certain example conventional fracturing fluid additives include polymers, cross-linkers, fluid loss additives, flow back additives, clay stabilizers, corrosion inhibitors, scale inhibitors, biocides, flow back additives, solid proppants, and gel breakers.

Referring to one embodiment, the primary liquid precursor is in the absence of solids, and the secondary liquid precursor is in the absence of solids. Therefore, the spherical bead-forming liquid composition is in the absence of solids. Certain example solids include sand, resin coated sand, pre-formed particles, filler, silica, silicate, silicon carbide, nano particles, fumed silica, carbon black, and combinations thereof. In at least one embodiment, the spherical bead-forming liquid composition is in the absence of proppant introduced from the surface. The spherical bead-forming liquid composition is in the absence of filler material. The in-situ spherical beads form in the absence of a template. As used, "template" refers to a material used to initiate the in-situ bead and on which the bead is allowed to build. Certain example templates include carbon black, fly ash, fumed silica, microspheres, silicon carbide, and the like. The absence of solids in the spherical bead-forming liquid composition introduced through a pump into the reservoir means minimal abrasion on the pumping equipment in contrast to conventional hydraulic fracturing fluids.

Current hydraulic fracturing processes in sandstone and shale formations require introducing solid proppants to keep the induced fractures conductive for hydrocarbon production. Introducing solid proppants, by injection or otherwise, presents several challenges and disadvantages. Solid proppant density is much higher than that of the carrying fluid, therefore the proppants tend to settle near the wellbore or to the bottom of the well or fractures. Fluids of high viscosity are often required, and they need to be introduced at a very high rate. In a complex fracture network, such as those developed in brittle shale rocks, the solids may not effectively turn the corner at the junction of the intersecting fractures. This limits the transported distance in the branch fractures, and is even likely to bridge off at these intersections leaving only the main planar fracture propped. The extensive network of induced fractures could close resulting in reduced deliverability of the fractured network.

Conventional proppants must remain suspended while the fracture is being propagated and until the fracture is closed. Highly viscous gel is needed to accomplish such an objective. These polymer-based gels could leave residue to reduce the proppant pack conductivity and near fracture face permeability. Certain embodiments of the present disclosure do not require highly viscous gels. Proppants of very light density have been developed to be able to allow using less viscous carrying fluids for efficiently transporting the proppants and minimize the gel damage. But the low density proppants naturally have lower strength and therefore cannot be used in deep and high stress reservoirs. Proppants are abrasive to pumping equipment and other tubes and piping, as the proppants are predominately silica, ceramic, or other hard solids.

The methods and compositions advantageously use less water to fracture a reservoir than a conventional hydraulic fracturing fluid. In at least one embodiment, the spherical bead-forming liquid composition uses about 95% less water than a conventional hydraulic fracturing fluid. In at least one embodiment, the spherical bead-forming liquid composition uses about 70% less water than a conventional hydraulic fracturing fluid. The reduced water leads to reduced clay swelling and fluid imbibition in reservoirs with clay compositions.

In at least one embodiment, fluid leak off of the spherical bead-forming liquid composition is encouraged, as the spherical bead-forming liquid composition forms in-situ spherical beads in the micro-fractures, which results in an increase in permeability and an increase in the effectiveness of the fracturing treatment.

In at least one embodiment, the fluid injected into the reservoir as the spherical bead-forming liquid composition reacts to form the in-situ spherical beads, in which all or substantially all of the spherical bead-forming liquid composition reacts leaving no fluid to flow back as waste water that requires disposal.

The spherical bead-forming liquid composition can penetrate deeply into the fractures produced in the reservoir formation, including microfractures, thus producing in-situ spherical beads in even the smallest fractures. The ability to penetrate fractures and microfractures generated in the reservoir formation can be attributed, in part, to the absence of solids in the spherical bead-forming liquid composition, as solids are known to block microfractures or any fractures larger than the diameter of the solid. The deep penetration of the spherical bead-forming liquid composition into the fractures and subsequent production of in-situ spherical beads generates flow channels to increase the hydrocarbon production.

The spherical bead-forming liquid composition can be introduced into a wellbore in a reservoir formation to form in-situ spherical beads as part of oil field applications to increase recovery of hydrocarbons. Certain example oil field applications include, but are not limited to, hydrocarbon recovery, fracturing, water shut off, drilling, cementing, acidizing, sand consolidation, permeability modification, water-flooding, chemical enhanced oil recovery (CEOR), polymer flooding, and $CO_2$ flooding.

Unexpectedly, the proper choice of micellar forming surfactants, liquid solvent carrier, pH, epoxy, curing agent, hardener, and co-curing agent, results in the formation of spherical beads within the formation. These spherical beads are effective in controlling fracture closure and, therefore, permeability due to their spherical shape, as shown in FIG. 1 compared to proppants of irregular particles or porous solid blocks.

EXAMPLES

Figure 2:
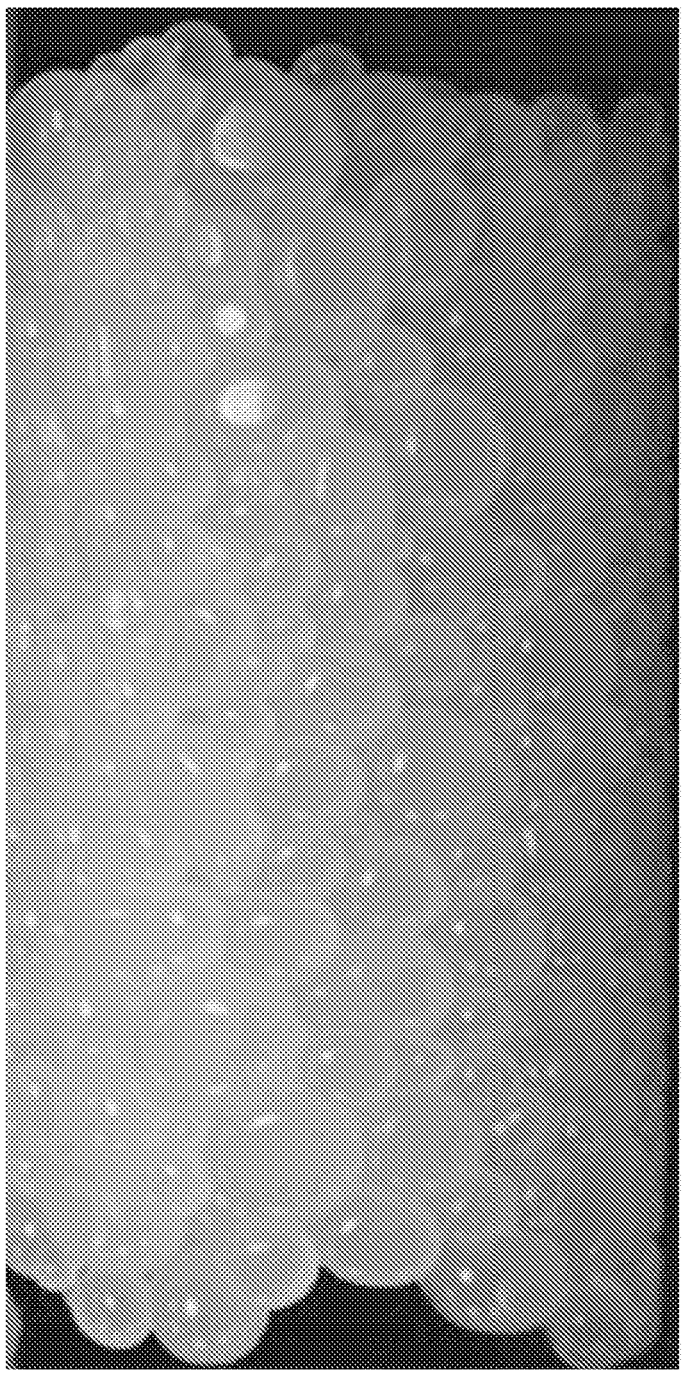
FIG. 2 is a pictorial representation of the spherical beads formed in Example 1.

Example 1. The primary liquid spherical precursor and secondary liquid precursor as shown in Table 1 were mixed for 10 minutes using a hand-mixer to form a spherical bead-forming liquid composition and then allowed to stand undisturbed at 25° C. for 6 hours in a 50 ml centrifuge tube. The in-situ spherical beads form as shown in FIG. 2. The strength of the spherical beads was tested using an Arbor 2-ton press and they held up a pressure greater than 1,000 lb.

TABLE 1

Spherical bead-forming formulation using an amphoteric surfactant.

| Primary liquid precursor | | Secondary liquid precursor | |
|---|---|---|---|
| Component | Wt. % | Component | Wt. % |
| Super Surfactant® 6-72 Alkylene amido propyl dimethyl betaine | 6.0 | Adogen™ AL42-12 Fatty acid imidazoline | 14.6 |
| 10% w/w aqueous NaCl | 51.2 | Isophorone diamine | 1.8 |
| Bis-phenol A epoxy | 21.9 | | |
| 50% w/w aqueous NaOH | 4.4 | | |
| NoFoam™ 1976 | 0.1 | | |

Note: Super Surfactant® 6-72 is a trademark of Oil Chem Technologies, Inc. Adogen™ is a trademark of Evonik Industries. NoFoam™ is a trademark of Oil Chem Technologies, Inc. Per Oil Chem Technologies, Inc. NOFOAM™ 1976™ is a silicone free anti-foam agent, combining properties of organosilicone and organic based foam control agents. It is stable in extreme pH ranges (pH<1-14) and it is stable at temperatures greater than 350° F.

Figure 3:
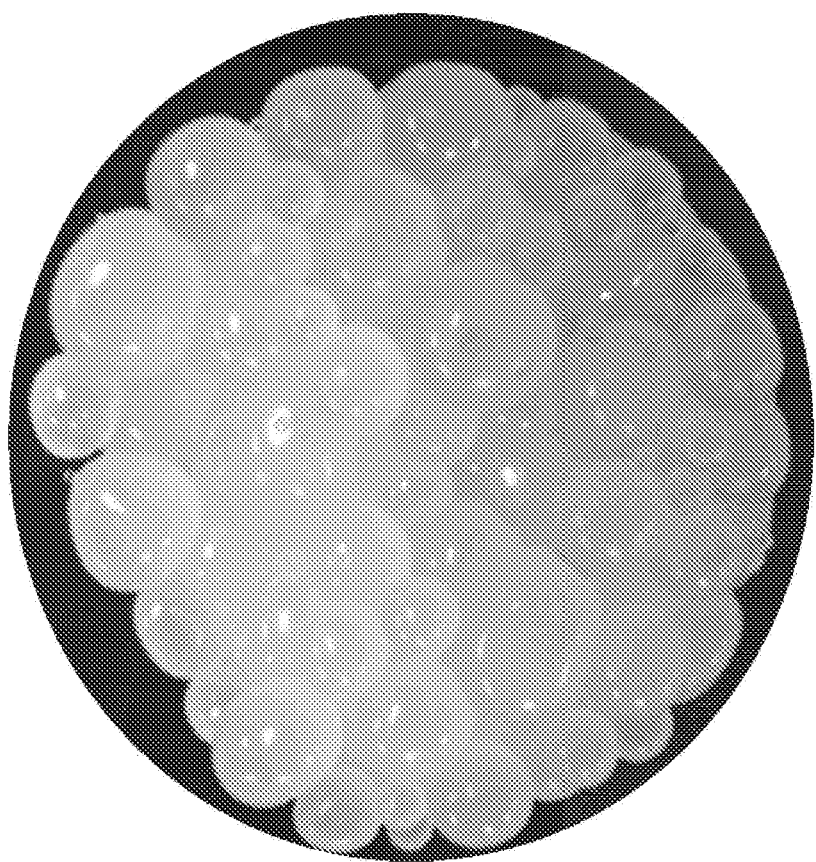
FIG. 3 is a pictorial representation of the spherical beads formed in Example 2.

Example 2. The primary liquid precursor and secondary liquid precursor formulated according to the composition as shown in Table 2 were mixed for 30 minutes using a Glas Col mixer for 30 minutes at 50% speed setting, then allowed to stand undisturbed at 60° C. for 6 hours in a capped 4 ounce jar. The spherical beads formed as shown in FIG. 3. The strength of the spherical beads was tested using the Arbor 2-ton press and they held up a pressure greater than 1,200 lb.

TABLE 2

In-situ spherical bead composition using NaCl solution and an anionic surfactant.

| Primary liquid precursor | | Secondary liquid precursor | |
|---|---|---|---|
| Component | Wt. % | Component | Wt. % |
| Sodium C14-16 alpha-olefin sulfonate | 10.7 | Ancamine™ T Polyamine adduct (2-hydroxy ethyl diethylene triamine) | 21.5 |
| 10% w/w aqueous NaCl | 21.5 | | |
| 2-ethyl hexanol | 10.7 | | |
| Bis-phenol F epoxy | 32.2 | | |
| 50% w/w aqueous NaOH | 3.2 | | |
| NoFoam™ 1976 | 0.2 | | |

Note: Ancamine™ is a trademark of Air Products Inc. Ancamine T curing agent (2-hydroxy ethyl) diethylene triamine (technical grade) is an ambient or elevated temperature curing agent for use with liquid epoxy resins. The (2-hydroxy ethyl) diethylene triamine is a curing agent for use with liquid epoxy resins. NoFoam™ is a trademark of Oil Chem Technologies, Inc. NOFOAM™ 1976™ is a silicone free anti-foam agent, combining properties of organosilicone and organic based foam control agents.

Example 3. The primary liquid precursor and secondary liquid precursor according to the composition as shown in Table 3 were mixed for 30 minutes to form the spherical bead-forming liquid composition and then allowed to stand undisturbed at 60° C. to react and form the in-situ spherical beads. The strength of the spherical beads was tested using the Arbor 2-ton press and they held up a pressure greater than 1,200 lb. The beads formed are shown in FIG. 4.

Example 3: In-situ spherical bead composition in sea water using cationic surfactant.

| Primary liquid precursor | | Secondary liquid precursor | |
|---|---|---|---|
| Component | Wt. % | Component | Wt. % |
| Hyamine™ 1622 | 7.9 | Max CLR™ B | 30.7 |
| Sea water | 30.7 | | |
| Max CLR™ A | 30.7 | | |

Note: Hyamine™ is a registered trademark of Lonza Corporation. Hyamine™ 1622 is a cationic detergent benzethonium chloride, also called (Diisobutylphenoxyethoxyethyl) dimethylbenzylammonium chloride solution. Max CLR™ is a trademark of Polymer Composites Corporation. Max CLR™ A is a modified bisphenol A epoxy resin, 90-100% by weight phenol, 4-(1-methylethylidene) Bis, Polymer with (Chloromethane) Oxerane, 1-5% by weight epoxidize diluent reactive, 0-10% by weight epoxidize cresylglyciderether modified, and 0.1-0.5% by weight non-silicone additive. Max CLR™ B is an amine modified curing agent. It contains about between 5-15% by weight benzyl alcohol, 15-35% by weight isophoronediamine adduct, and 50-60% by weight aliphatic amine adduct.

Figure 5:
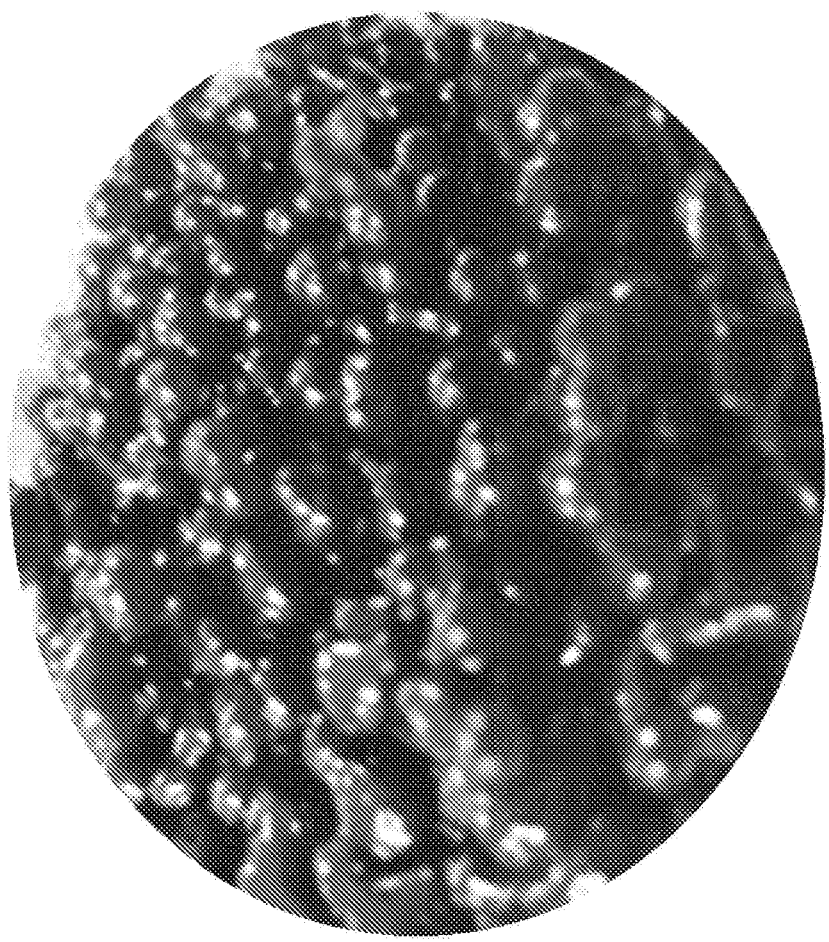
FIG. 5 is a pictorial representation of the spherical beads formed in Example 4.

Example 4. This is an example using crude oil as the solvent in the primary liquid precursor. The primary liquid precursor was mixed with the secondary liquid precursor for 30 minutes to form the spherical bead-forming liquid composition. The spherical bead-forming liquid composition was then held at 60° C. for 10 hours and as a result formed black-colored spherical beads as shown in FIG. 5. The strength of the spherical beads was tested using the Arbor 2-ton press. The spherical bead strength held up to a pressure greater than 1,000 lb.

TABLE 4

In-situ spherical bead formation composition using crude oil as solvent.

| Primary liquid precursor | | Secondary liquid precursor | |
|---|---|---|---|
| Component | Wt. % | Component | Wt. % |
| Super Surfactant® 6-72 | 8.6 | Mackazoline™ T Fatty acid imidazoline complex salt | 10.8 |
| 10% w/w aqueous NaCl | 10.8 | Isophorone diamine | 0.6 |
| 50% w/w aqueous NaOH | 6.5 | Benzyl alcohol | 4.5 |
| Crude oil, API gravity = 29 | 21.6 | | |
| Bisphenol F Epoxy resin | 36.6 | | |

Note: Super Surfactant® is a trademark of Oil Chem Technologies, Inc. Makazoline™ is a trademark of Solvay. Per Solvay, Makazoline™ is Fatty amine which, when neutralized with common acids, acts as a cationic surface active agent and emulsifier. It is oil soluble and water dispersible and contains no solvents. A synonym is tall oil hydroxyethyl imidazoline.

Figure 6:
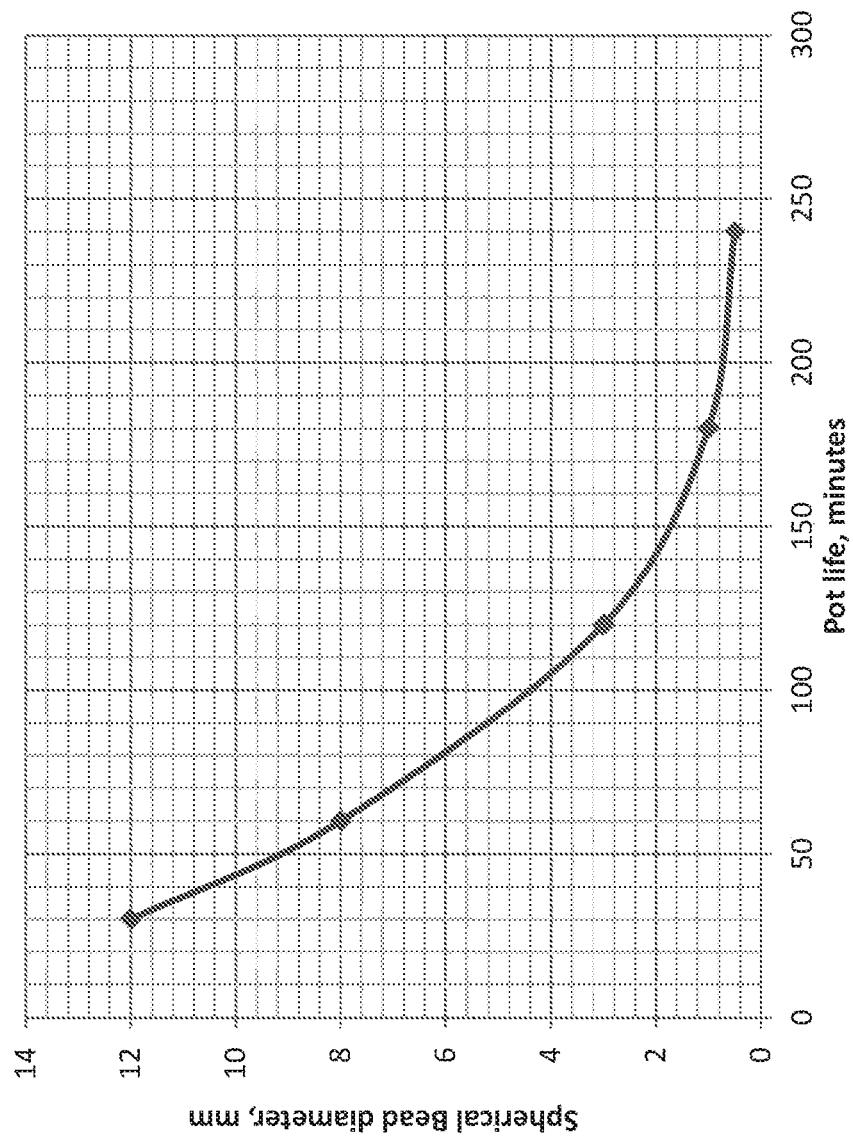
FIG. 6 is a graph of the effect of pot-life versus bead size.

Example 5. The primary liquid precursor and secondary liquid precursor are mixed continuously in a stainless steel beaker using a mechanical stirrer with the rheostat speed set at 5 and allowed to react. The stainless steel beaker is set in a water bath to maintain the reaction temperature at 60° C. During the reaction, samples were collected in 60 minute intervals and placed in a 60° C. oven un-disturbed for 4 hours to evaluate the size of the spherical beads formed. The test showed that the size of the spherical beads got smaller with increased mixing time, as shown in the graph of the diameter of the spherical beads versus the pot life in FIG. 6.

Figure 7:
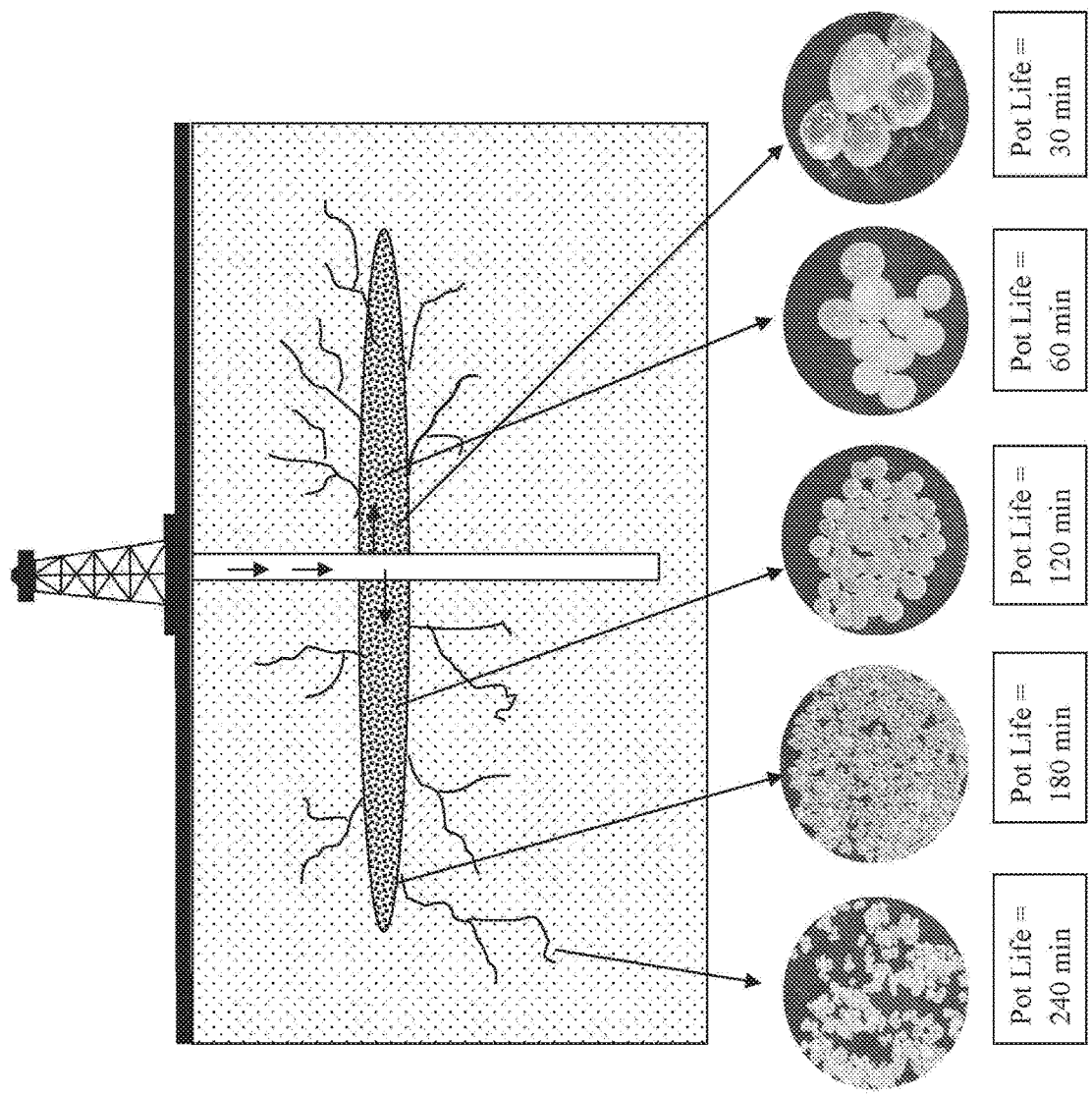
FIG. 7 is a pictorial and schematic representation of the estimated distribution of bead sizes within fractures in a reservoir.

The diameter of the spherical beads ranged from 0.5 mm to 12 mm due to the shear energy and the mixing time. The size of the spherical beads can be correlated to the residence time of the spherical bead-forming liquid composition in the fracturing process where the fluids in the fracture front experience the longest pumping time and form smaller beads at the tip of the fractures and in the micro-fractures, whereas the fluids closer to the well bore form larger beads. FIG. 7 shows the likely size of the spherical beads formed in the fractures in one embodiment. The pot life is the time prior to bead formation and correlates to the distance the fracturing fluid travels through the reservoir before the pumping in stopped.

TABLE 5

Selective fracture packing by pot life control.

| Primary liquid precursor | | Secondary liquid precursor | |
|---|---|---|---|
| Component | Wt. % | Component | Wt. % |
| Super Surfactant® 6-72 Alkylene dimethyl amido betaine | 7.1 | Tall Oil Fatty Acid Imidazoline | 28.3 |
| 10% w/w aqueous NaCl solution | 28.3 | Diethylene triamine | 0.7 |
| 50% w/w aqueous NaOH | 7.2 | | |
| Bisphenol F Epoxy | 28.3 | | |
| NoFoam™ 1976 | 0.1 | | |

Example 6. In this example a glass column was prepared containing spherical beads formed using the method described in Example 1 (Example 1 beads). A second column was prepared using 40-60 mesh sand. A crude oil of API gravity 29 was poured into each tube, and the rate at which the oil flowed through the columns was observed and compared.

Figure 8:
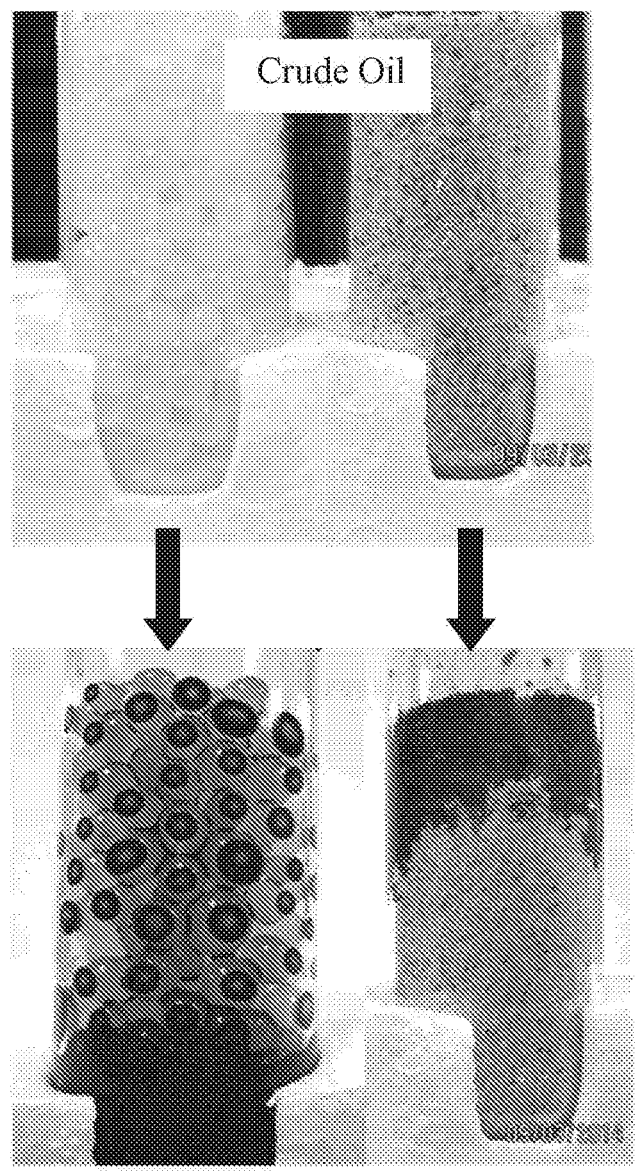
FIG. 8 is a pictorial representation of a comparison of flow of oil through a container with sand (right) and a container with spherical beads according to an embodiment as disclosed in Example 6 (left).

FIG. 8 shows the pictures taken before and at 5 minutes after the oil was added. The oil flow through the column with Example 1 beads (left) was faster than the flow of oil through the column with sand (right), illustrating the effectiveness of the beads as a proppant compared to the sand. Without being bound to a particular theory, it is believed that the use of fracturing sand as a proppant is limited because if it is too large it will settle out before propagating deep into the fracture. Alternately, it may plug the pumping equipment. The spherical beads that are larger than the sand create larger spaces between the individual beads and thus greater permeability.

Figure 9:
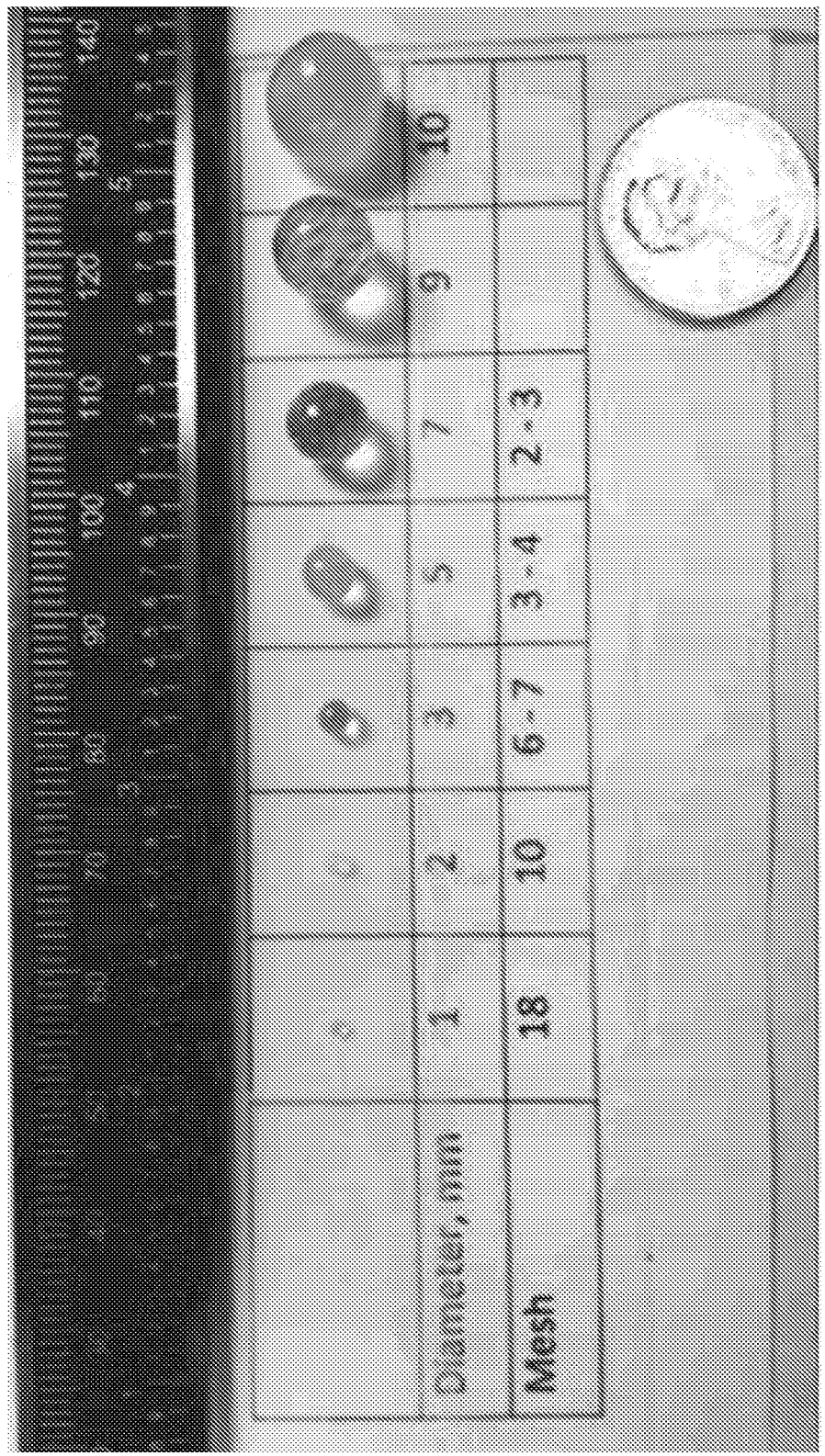
FIG. 9 is a pictorial representation of a variety of sizes of solid beads produced under an in-situ temperature of 150° F.

Referring now to FIG. 9, a pictorial representation is shown of a variety of sizes of solid beads produced under an in-situ temperature of 150° F. The formation of similar beads is shown in FIG. 1 as well. The spherical beads are strong enough to withstand overburden pressure and prop open fractures formed during hydraulic fracturing and acidizing. Without being bound by any theory or principle, the strength, hardness, and resilience of the beads can be controlled in part by component placement in the internal and external phases of an emulsion. For example, in some embodiments, an epoxy is placed in an internal phase of an emulsion as droplets, and a curing agent is placed in the external phase of the emulsion. One design is to have the curing agent in the external phase diffuse through the internal-external phase boundary into the droplets, and the epoxy and curing agent then react and solidify within the droplets to form beads. However, in some embodiments, such a method of producing an emulsion produces weak beads, or beads that lack strength, hardness, and resilience.

In some embodiments, in order to increase the strength of the beads, epoxy and curing agent can both be mixed into droplets in an internal phase of an emulsion. In such an embodiment, each droplet in the emulsion contains both the epoxy and curing agent from the beginning. The external phase can simply be a liquid which allows the droplet to reside and maintain spherical form; of course, the external liquid can also contain another curing agent.

Figure 10:
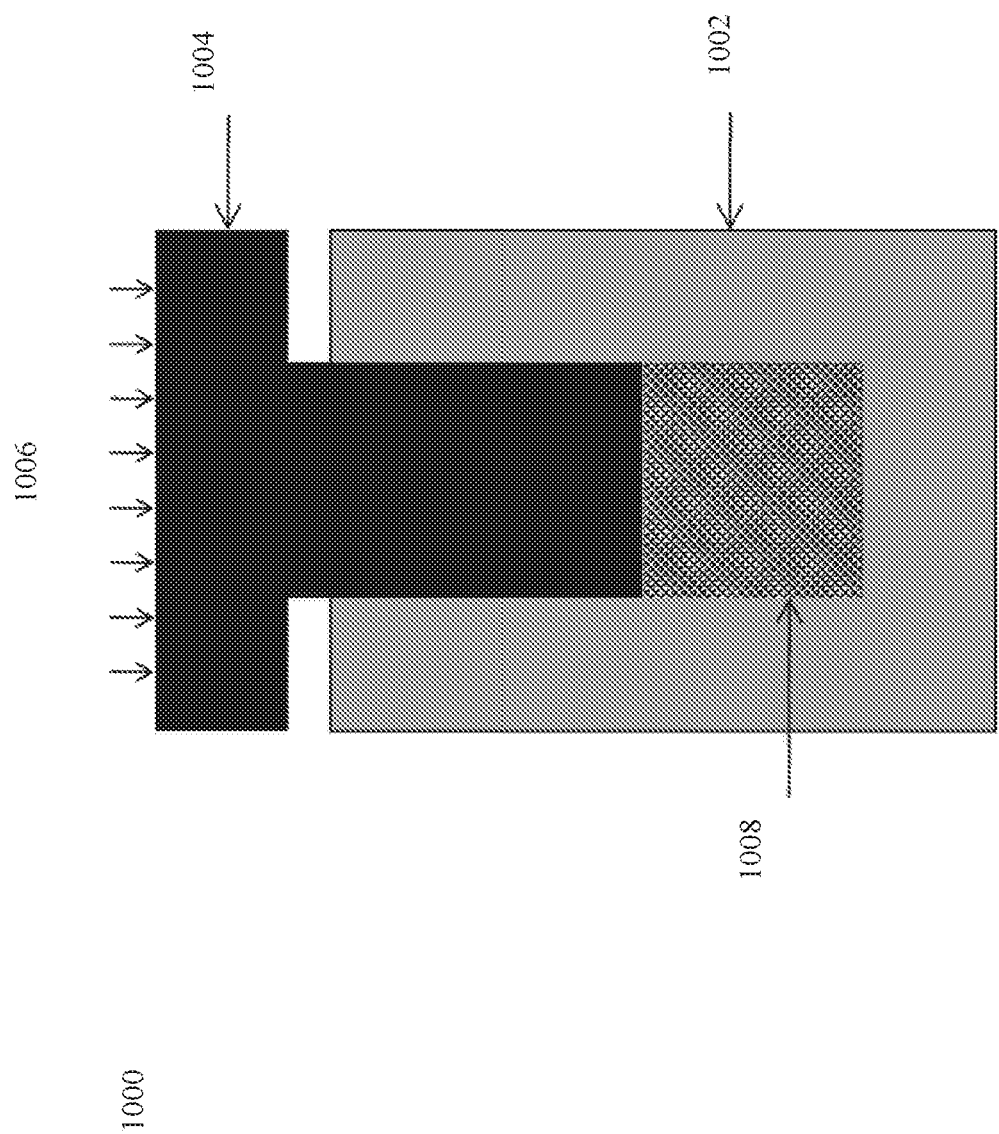
FIG. 10 is a schematic representation of a mechanical load-bearing test performed on spherical beads produced by embodiments of the present disclosure.

Referring now to FIG. 10, a schematic representation is shown of a mechanical load-bearing test performed on spherical beads produced by embodiments of the present disclosure. Mechanical property tests are conducted by using a hydraulic press 1000 with a load cell 1002 and a piston 1004 to apply a load 1006 on a 1 inch diameter by 1 inch thick proppant pack 1008 at ambient temperature. The stress is slowly applied to the cylindrical pack at a constant displacement speed (0.5 mm/min) until the stress reaches 14,000 psi. The stress vs. strain curve is constructed to analyze the mechanical behavior and strength of the packed material. FIG. 10 illustrates the load cell assembly with the proppant pack.

The piston is set to continuously move down at a constant speed of 0.5 mm/min while the resultant load due to the proppant pack resisting the change in thickness is measured by a transducer on the hydraulic frame of an Instron Model 3069. Comparison between the in-situ proppant and conventional proppants, including 16/30 intermediate strength proppants (ISP), 16/20 resin coated proppants (RCP), 20/40 light weight ceramic proppants (LWCP), and high strength bauxite proppants (HSP), are made.

Figure 11:
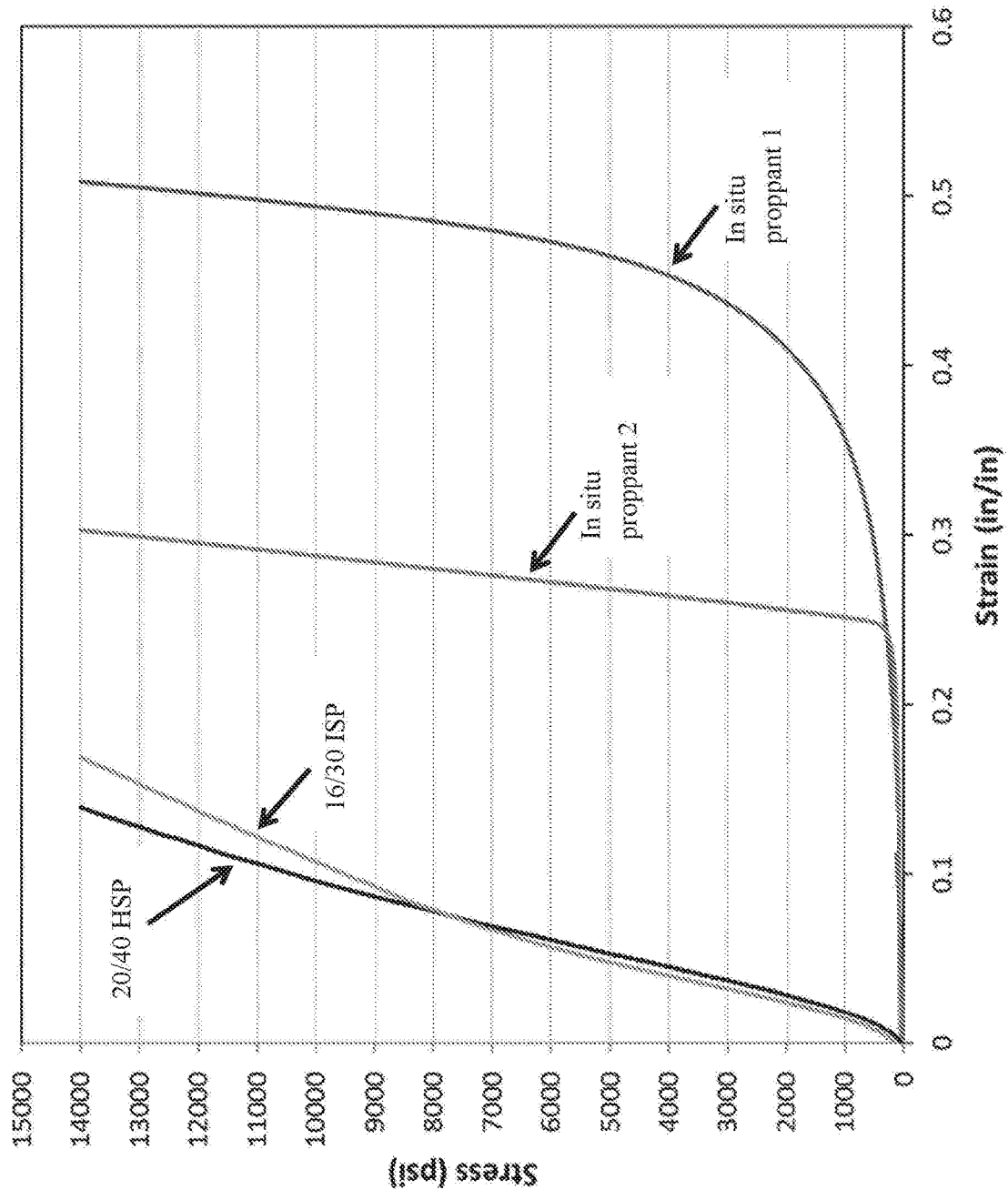
FIG. 11 is a graph comparing the mechanical behavior among two in-situ proppant formulations of the present disclosure and conventional high strength bauxite proppant (20/40 HSP) and intermediate strength proppant (16/30 ISP).

Referring now to FIG. 11, a graph is shown comparing the mechanical behavior among two in-situ proppant formulations of the present disclosure, conventional high strength bauxite proppant (20/40 HSP), and intermediate strength proppant (16/30 ISP). FIG. 11 shows the stress vs. strain curve for the mechanical behavior comparison between the in-situ proppants, intermediate strength proppant (ISP), and high strength bauxite proppant (HSP) packs. Two chemical formulations of the in-situ proppants are tested. Both in-situ proppants show highly flexible and elastic characteristics in the low stress regime.

As the stress increases, the proppant packs become much stiffer while remaining highly elastic. Loading the proppant packs to 14,000 psi does not result in any crushing. The grain shapes remain nearly the same as indicated by the photo in FIG. 12 for in-situ proppant-1. The bulk density of the in-situ proppant pack is approximately 0.68, and the grain apparent density is 1.05. The porosity of the initial proppant pack is approximately 35%. There is a thickness reduction experienced by the in-situ proppant pack under 14,000 psi stress.

The stress-strain curves for the two in-situ proppants show reduction of pack thickness by 30% before pressure is applied (in-situ proppant-2) and 50% after 14,000 lbs/in$^2$ pressure is applied (in-situ proppant-2). These stains translate to losses of porosity by the same levels.

Since the proppant diameter of the spherical beads is significantly larger than the diameter of conventional proppant particulates, the initial conductivity will be significantly higher than it is with conventional proppants. Along with the zero fines generation, the conductivity is expected to be sufficient over time.

Figure 12:
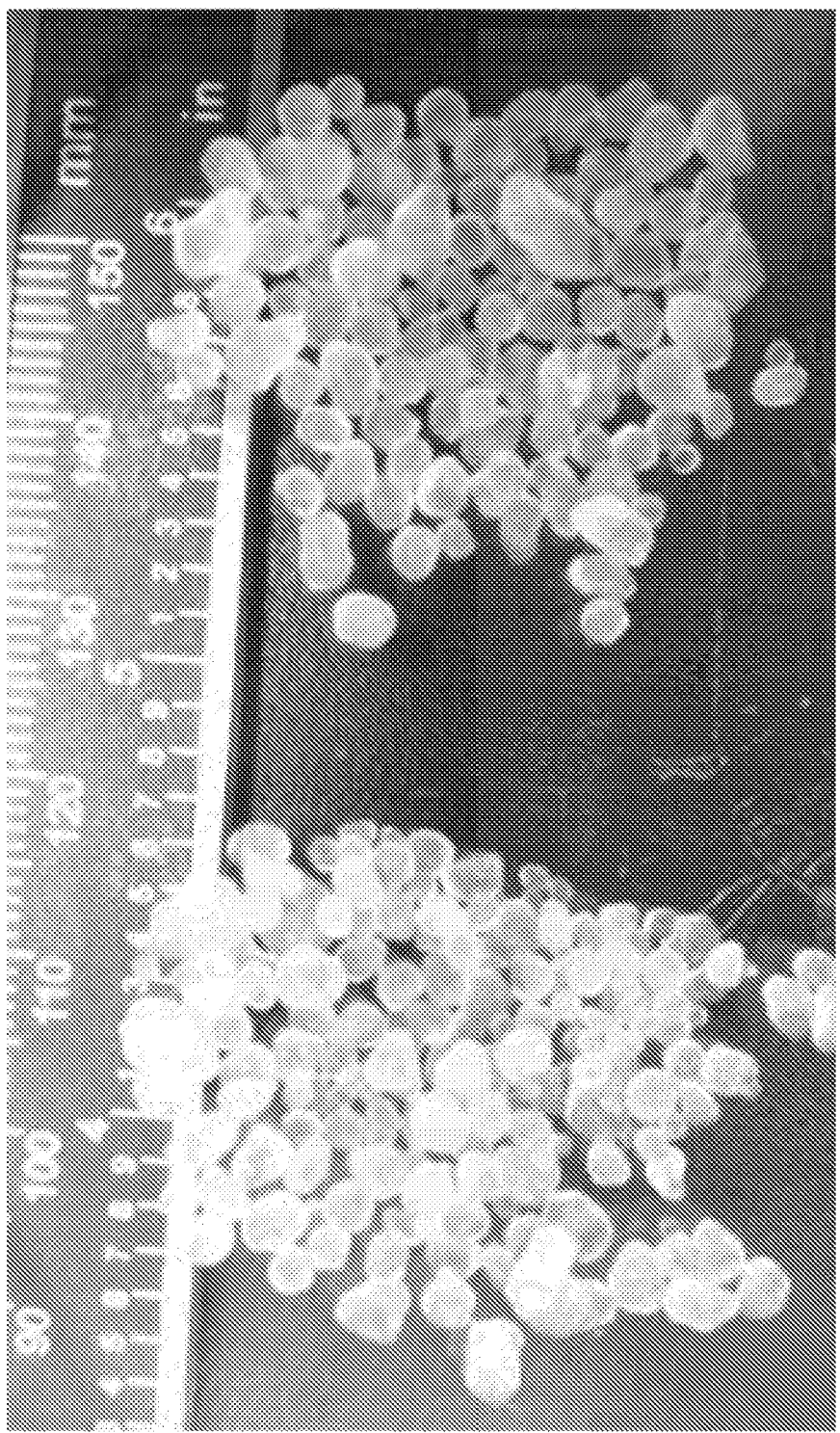
FIG. 12 is a pictorial representation of the spherical particles of the in-situ proppant 1 pack from FIG. 11 rebounded to nearly the same shape as stress is released from the maximum loading of 14,000 pounds per square inch (psi).

Referring now to FIG. 12, a pictorial representation is shown of the spherical particles of the in-situ proppant 1 pack from FIG. 11 rebounded to nearly the same shape, as stress is released from the maximum loading of 14,000 psi. Conventional brittle HSP shows high stiffness throughout the loading process, however the stress-strain curve shows very minor elastic modulus reduction when loaded to greater than 10,000 psi. ISP pack starts to deviate from the linear elasticity at 8,000 psi. These are the stresses at which the onset of grain crushing is initiated.

Figure 13:
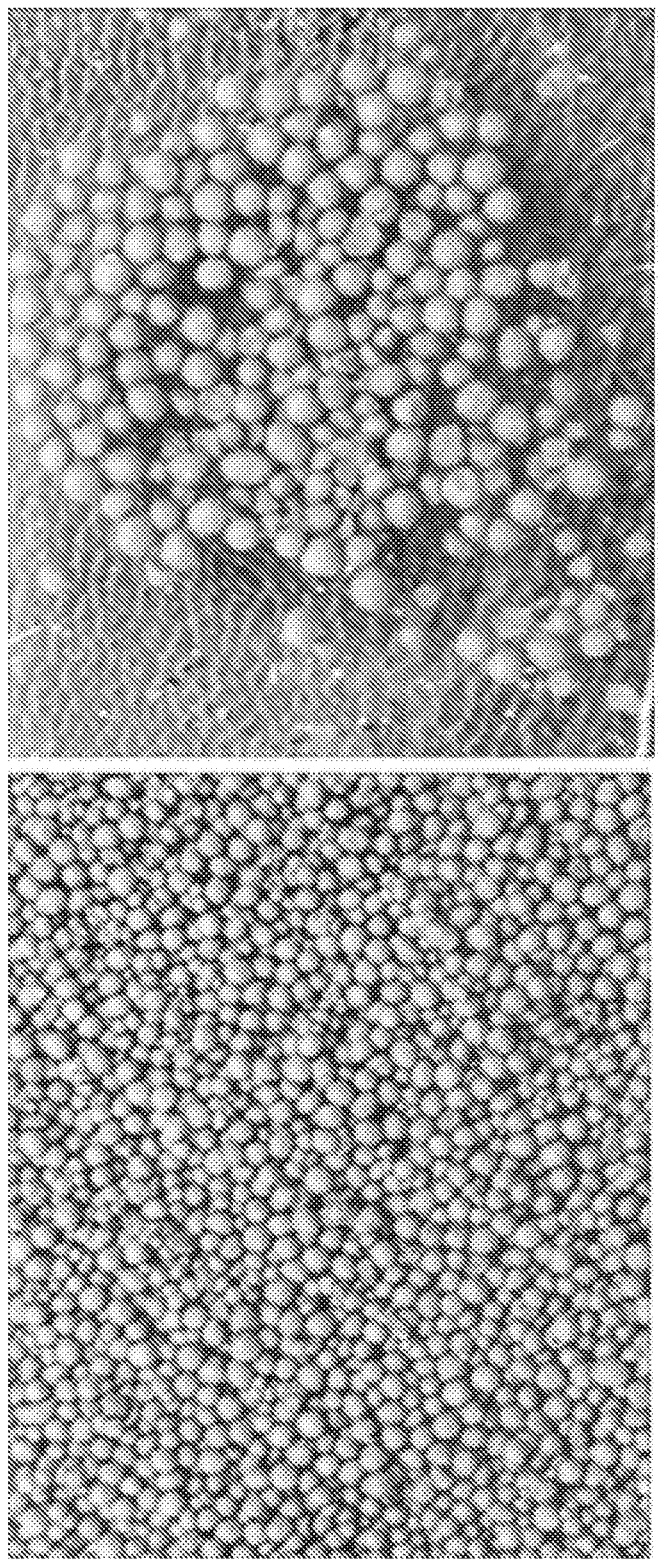
FIG. 13 is a pictorial representation showing grains of the 20/40 HSP from FIG. 11 before (left) and after (right) being loaded to 14,000 psi.
Figure 14:
FIG. 14 is a pictorial representation of the grains of the 16/30 ISP from FIG. 11 before (left) and after (right) being loaded to 14,000 psi.
Figure 14:
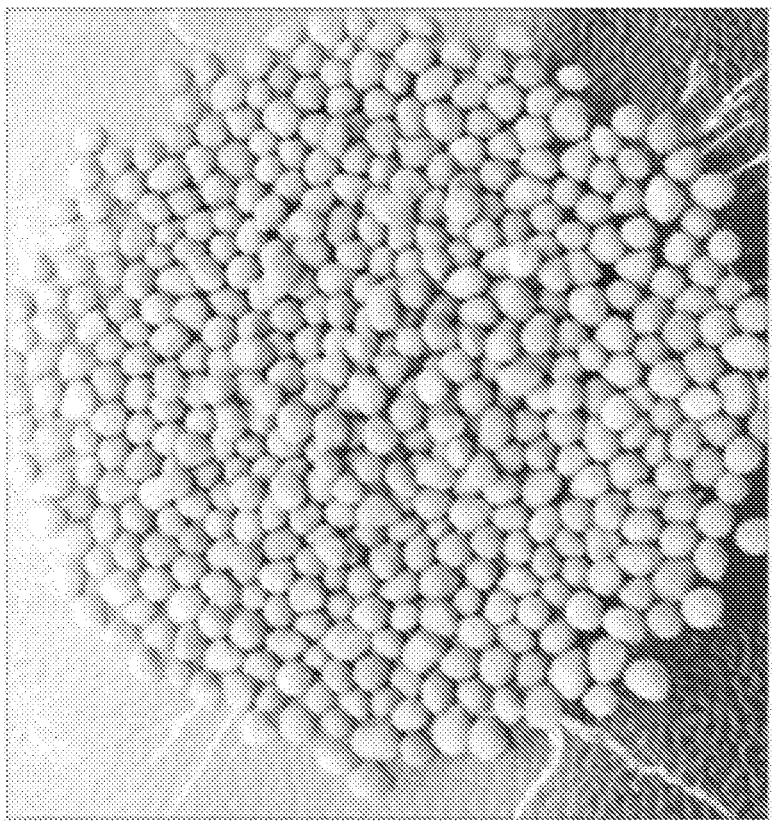

FIG. 13 shows a few crushed grains after the HSP is loaded to 14,000 psi, whereas FIG. 14 shows a significant fines content is generated when the ISP is loaded to 14,000 psi. FIG. 13 is a pictorial representation showing grains of the 20/40 HSP from FIG. 11 before (left) and after (right) being loaded to 14,000 psi. FIG. 14 is a pictorial representation of the grains of the 16/30 ISP from FIG. 11 before (left) and after (right) being loaded to 14,000 psi. Significant grain crushing and fines generation is observed.

Figure 15:
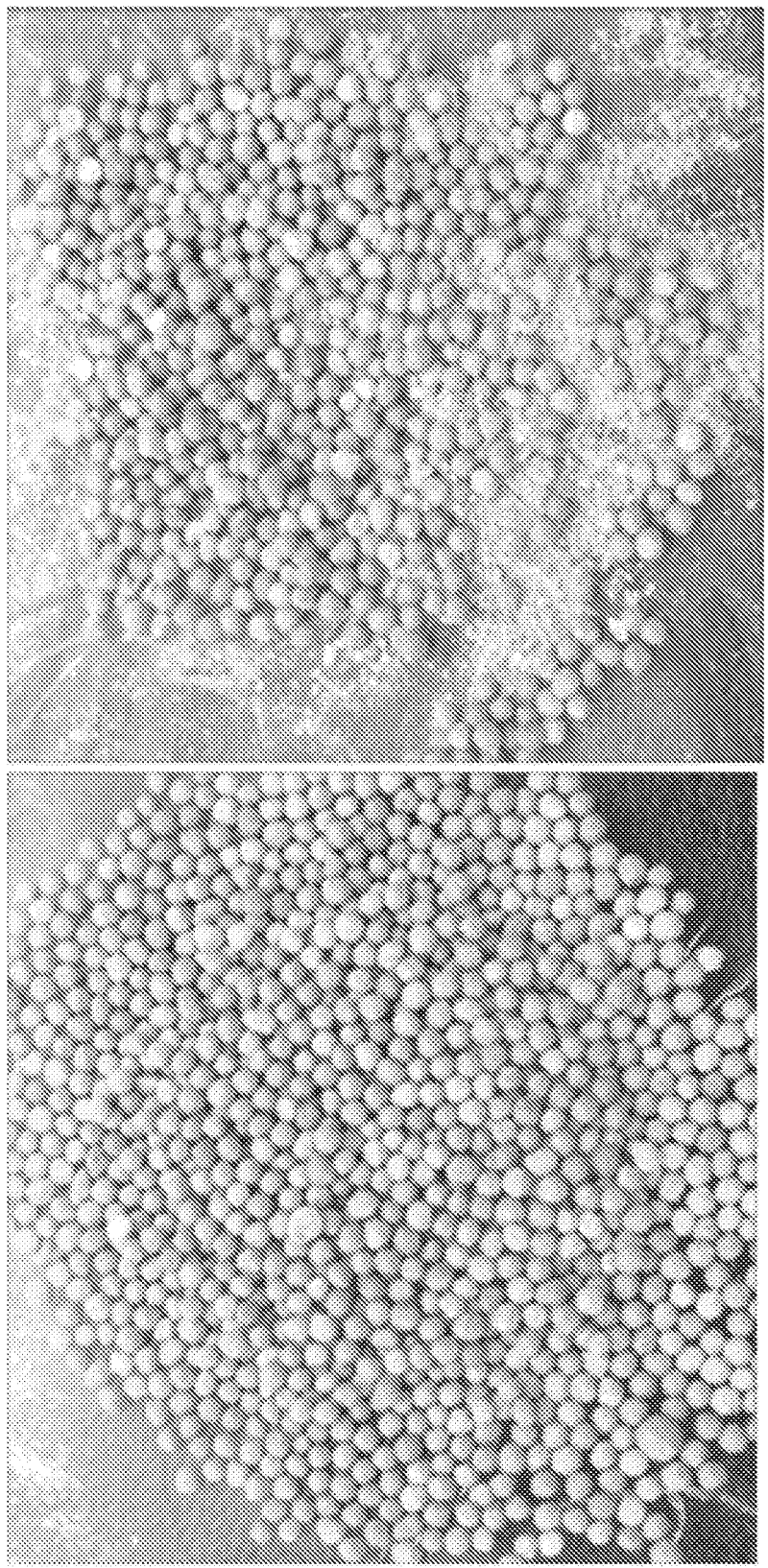
FIG. 15 is a pictorial representation of grains of 16/20 resin coated proppant (RCP) before (left) and after (right) being loaded to 14,000 psi.

FIG. 15 is a pictorial representation of grains of 16/20 resin coated proppant (RCP) before (left) and after (right) being loaded to 14,000 psi. Significant grain crushing and fines generation is observed.

Figure 16:
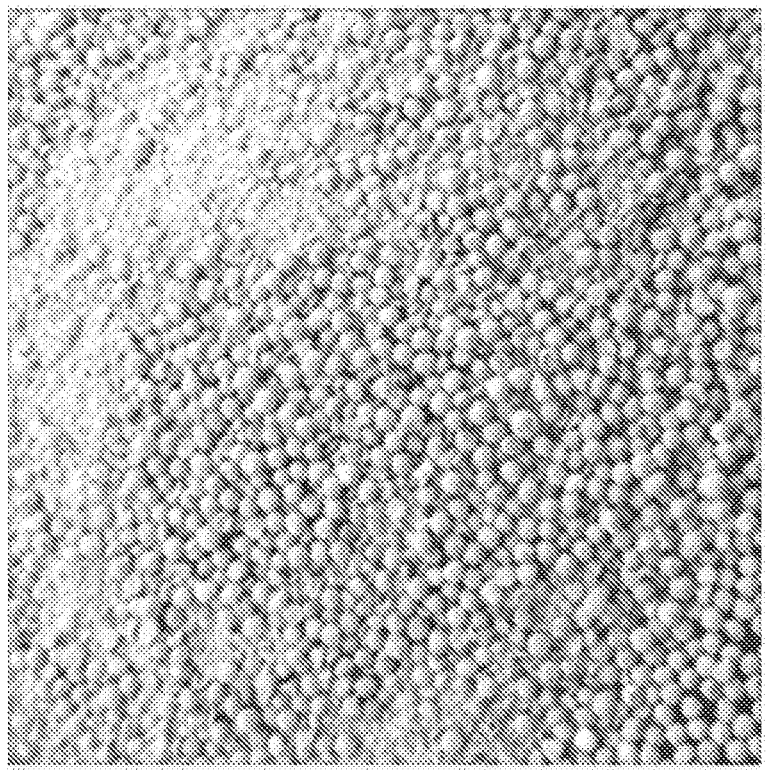
FIG. 16 is a pictorial representation of grains of 20/40 light weight ceramic proppant (RCP) before (left) and after (right) being loaded to 14,000 psi.
Figure 16:
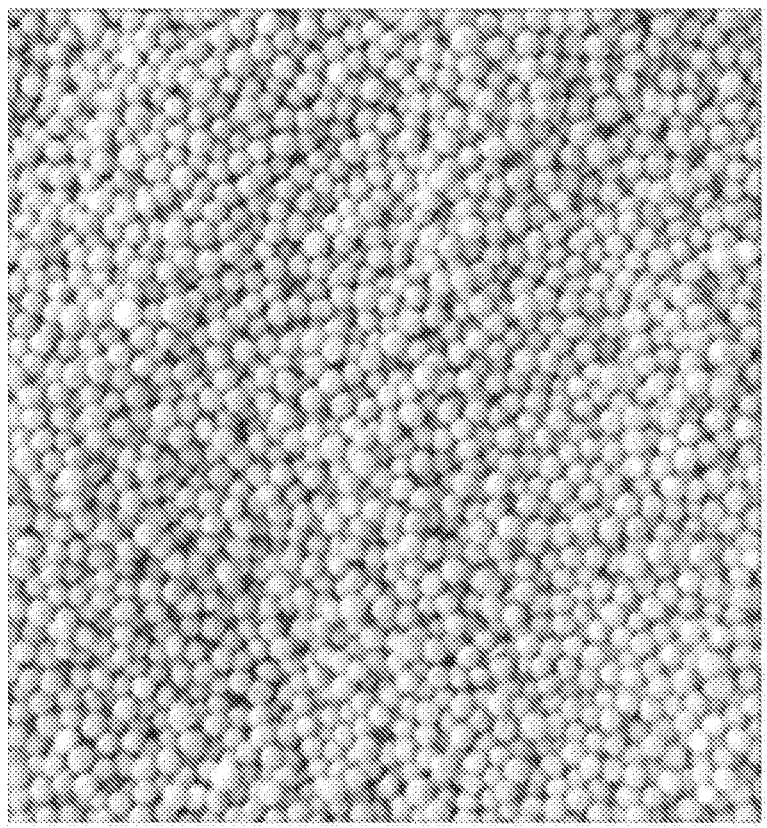

FIG. 16 is a pictorial representation of grains of 20/40 light weight ceramic proppant (RCP) before (left) and after (right) being loaded to 14,000 psi. Significant grain crushing and fines generation is observed.

Example 7. Referring now to Table 6, the primary liquid precursor was added to the secondary liquid precursor, and the combined liquid was mixed continuously in a stainless steel beaker using a mechanical stirrer with the rheostat speed set at 50% and allowed to react. The stainless steel beaker was set in a water bath to maintain the reaction temperature at about 60° C. After 2 minutes of mixing, the mixture was placed in a 50 ml centrifuge tube, capped, and allowed to age in a 90° C. oven for about 3 hours, after which the tube was placed in a pressure bomb under 200 psi nitrogen pressure and aged an additional 8 hours at about 130° C.

The tube containing the mixture was removed from the oven and allowed to cool to room temperature, after which the pressure was released. The amount of beads and free external liquid was measured. The beads formed were washed with water and allowed to dry. The beads were then measured for size and their compressive strength was measured using an Instron Model 3369. The diameter of the spherical beads formed ranged from about 1.5 mm to about 5.2 mm with the majority about 4 mm in diameter. The compressive strength (Young's Modulus) was found to be 7200 pound-force/square foot (lbf/ft$^2$). The final product consisted of about 30% liquid and 70% beads.

TABLE 6

| Beads formed using C16-C18 linear fatty alcohol. | | | |
|---|---|---|---|
| Primary liquid precursor | | Secondary liquid precursor | |
| Component | Wt. % | Component | Wt. % |
| Behenyl amidopropyl dimethyl betaine 30% aqueous | 2.0 | Sea Water | 30.8 |

TABLE 6-continued

Beads formed using C16-C18 linear fatty alcohol.

| Primary liquid precursor | | Secondary liquid precursor | |
|---|---|---|---|
| Component | Wt. % | Component | Wt. % |
| C16-18 linear fatty alcohol | 0.5 | Diethylene triamine | 0.7 |
| 2,4-diethyl-6-methyl-1,3-benzenediamine | 10.0 | 50% w/w aqueous NaOH | 4.0 |
| Bisphenol A Epoxy | 50.7 | Sodium Aluminate | 1.0 |
| Sodium Aluminate | 1.0 | | |

Example 8. In this example, the bead-forming compound is in the primary liquid precursor and the curing agent is in the secondary liquid precursor. The primary liquid precursor and secondary liquid precursor are formulated according to the composition as shown in Table 7. The primary and secondary liquid precursors were mixed together for 2 minutes using a Glos Col mixer at 50% speed, then set static at ambient temperature. The pictures of the mixture were taken at an initial time, 30 minutes, and 60 minutes, for example as shown in FIG. 1. Micelle formation with time is shown clearly in FIG. 1, and the micelles grow with time.

TABLE 7

Example bead-forming composition with primary liquid precursor and secondary liquid precursor.

| Primary liquid precursor | | Secondary liquid precursor | |
|---|---|---|---|
| Component | Wt. % | Component | Wt. % |
| Hyamine™ 1622 | 8.0 | Max CLR™ B | 20.0 |
| Sea water | 32.0 | | |
| Max CLR™ A | 40.0 | | |

Sea water can be used in either part A or B. Certain preferred formulations use it in part B. Other solvents, both aqueous and non-aqueous, have been found to be suitable depending on the choice of epoxy resin, surfactant, and curing agents.

Hyamine™ is a registered trademark of Lonza Corporation, Basel, Switzerland. Hyamine™ 1622 is a cationic detergent benzethonium chloride, also called (Di-isobutylphenoxyethoxyethyl)dimethylbenzylammonium chloride solution. Max CLR™ is a trademark of Polymer Composites Corporation. Max CLR™ A is a modified bisphenol A epoxy resin, 90-100% by weight phenol, 4-(1-methylethylidene) Bis, Polymer with (Chloromethane) Oxirane, 1-5% by weight epoxidize diluent reactive, 0-10% by weight epoxidize cresylglyciderylether modified, and 0.1-0.5% by weight non-silicone additive. Max CLR™ B is an amine modified curing agent. It contains about between 5-15% by weight benzyl alcohol, 15-35% by weight isophoronediamine adduct, and 50-60% by weight aliphatic amine adduct.

Example 9. This is an example where the surfactant is used in both primary and secondary liquid precursors. As shown in Table 8, this example shows the primary liquid precursor was mixed using two different types of curing agents in order to control the desired curing time along with the surfactant and fatty alcohol in a beaker. The secondary liquid precursor was mixed in another beaker and heated to 60° C. While mixing the secondary liquid precursor using a Glas Col stirrer with the rheostat speed set at 50%, the primary precursor was added slowly to the secondary liquid precursor and mixing continued for 2 minutes. The mixture was then transferred into a 50 ml centrifuge tube, capped, and placed in a Fann high temperature Aging Cell under 200 psi nitrogen pressure and cured for 3 hours at 130° C. The compressive strength (Young's Modulus) of the beads was measured using an Instron Model 3369 Dual Column Universal Testing System. The compressive strength (Young's Modulus) was found to be 9800 pound-force/square foot ($lbf/ft^2$). (See FIG. 10).

TABLE 8

In-situ bead composition using Surfactants in both primary and secondary liquid precursors.

| Primary liquid precursor | | Secondary liquid precursor | |
|---|---|---|---|
| Component | Wt. % | Component | Wt. % |
| Iso-stearyl amidopropyl dimethyl betaine | 2.5 | Sea Water | 29 |
| C16-18 linear fatty alcohol | 0.5 | Sodium lauryl (2EO) ether sulfate | 2.5 |
| 1,3-Benzenediamine, 2,4 (or 4,6)-diethyl-6(or 2)-methyl- | 8.25 | 50% w/w aqueous NaOH | 3.0 |
| Isophorone diamine | 4.25 | | |
| Bis-phenol A di-glycidyl ether | 50.0 | | |

Example 10. Change units of Young's Modulus. This Example shows the results using surfactant and amine curing agent only in the primary liquid precursor. The bis-phenol A diglycidyl ether, 1,3-Benzenediamine, 2,4 (or 4,6)-diethyl-6(or 2)-methyl-, and, behenyl amidopropyl dimethyl betaine, are mixed until uniform and allowed to react at room temperature (22° C.) for 2 minutes. The seawater and NaOH are premixed to form the secondary liquid precursor. The primary liquid precursor is added dropwise to the secondary liquid precursor with mixing in a stainless steel beaker contained in a 60° C. water bath. After 30 minutes of mixing at 60° C., the mixture is transferred to a 50 ml centrifuge tube and allowed to cure for 16 hours in an oven set at 90° C. The mixture formed small uniform beads with a diameter of about 0.8 to about 1.4 mm. A cylinder of beads 1 inch high and 1 inch in diameter was compressed to 14,000 psi on the Instron and gave a Young's Modulus of Compression of 61,000 pounds of force and a compression of 20% (0.2 inch) of the original height at 14,000 psi.

TABLE 9

In-situ bead composition using surfactant only in the primary liquid precursor.

| Primary liquid precursor | | Secondary liquid precursor | |
|---|---|---|---|
| Component | Wt, % | Component | Wt, % |
| Bis-phenol A diglycidyl ether | 60.0 | Seawater | 20.0 |
| 1,3-Benzenediamine, 2,4 (or 4,6)-diethyl-6(or 2)-methyl- | 15.0 | 50% NaOH | 2.0 |
| Behenyl amidopropyl dimethyl betaine | 3.0 | | |

Although the disclosure has been described with respect to certain features, it should be understood that the features and embodiments of the features can be combined with other features and embodiments of those features.

Although the disclosure has been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed throughout as from about one particular value, and to about another particular value. When such a range is expressed, it is to be understood that another embodiment is from the one particular value and to the other particular value, along with all combinations within said range.

As used throughout the disclosure and in the appended claims, the words "comprise," "has," and "include" and all grammatical variations thereof are each intended to have an open, non-limiting meaning that does not exclude additional elements or steps.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

While the disclosure has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present disclosure may suitably comprise, consist or consist essentially of the elements disclosed and may be practiced in the absence of an element not disclosed.

What is claimed is:

1. A method of fracturing a reservoir with a hydraulic fracturing fluid formulation that generates fractures in the reservoir, the method comprising the steps of:
   mixing a primary liquid precursor and a secondary liquid precursor to form a spherical bead-forming liquid composition;
   pumping the spherical bead-forming liquid composition into an injection well in the reservoir at an external pressure greater than a pressure to generate fractures in the reservoir;
   allowing the spherical bead-forming liquid composition to migrate into the fractures of the reservoir; and
   allowing the primary liquid precursor and the secondary liquid precursor to react to form in situ solid, individual, spherical beads, where the solid, individual, spherical beads are formed from non-solids bearing liquids and are operable to keep the fractures open against an overburden pressure after the external pressure is released.

2. The method of claim 1, where the primary liquid precursor comprises a micellar forming surfactant.

3. The method of claim 2, where the micellar forming surfactant is selected from the group consisting of anionic surfactants, cationic surfactants, nonionic surfactants, amphoteric surfactants and combinations thereof.

4. The method of claim 1, where the primary liquid precursor comprises a bead-forming compound.

5. The method of claim 4, where the bead-forming compound is selected from the group consisting of bis-phenol A, bis-phenol F, cycloaliphatic epoxides, glycidyl ethers, poly glycidyl ethers, novalac resins, polyurethane resins, acrylic resin, phenol-formaldehyde resin, epoxy functional resins, and combinations thereof.

6. The method of claim 1, where the primary liquid precursor comprises a non-solids bearing liquid solvent.

7. The method of claim 6, where the non-solids bearing liquid solvent is selected from the group consisting of water, brine containing mono and polyvalent salt, sea water, mineral oil, kerosene, diesel, crude oil, and petroleum condensate, low molecular weight alcohols, low molecular weight alcohol ethers, benzyl alcohol, and benzyl alcohol ethers, ethyl carbitol ether, γ-butyrolactone, phenol alkoxylates, alkylphenol alkoxylates, and combinations thereof.

8. The method of claim 1, where the primary liquid precursor comprises an anti-foaming agent.

9. The method of claim 1, where the primary liquid precursor comprises a pH control agent.

10. The method of claim 9, where the pH control agent is selected from the group consisting of hydrochloric acid, sulfuric acid, phosphoric acid, sodium hydroxide, potassium hydroxide, sodium carbonate, sodium aluminate, potassium carbonate, potassium phosphate, sodium silicate, potassium silicate, organic acids, and combinations thereof.

11. The method of claim 1, where the primary liquid precursor comprises a retarder.

12. The method of claim 1, where the secondary liquid precursor comprises a curing agent.

13. The method of claim 12, where the curing agent is selected from the group consisting of lewis acids, tertiary amines, mono ethanol amine, benzyl dimethylamine, 1,4-diaza-bicylo [2,2,2] octane, 1,8-diazabicylo [5,4,0] undec-7ene, cycloaliphatic amines, amidoamines, aliphatic amines, aromatic amines, isophorone, isophorone diamine, polyamides, boron tri-fluoride derivatives, functional resins, imidazoles, imidazolines, mercaptans, sulfide, hydrazides, amides and their derivatives.

14. The method of claim 1, where the secondary liquid precursor comprises a co-curing agent.

15. The method of claim 14, where the co-curing agent is selected from the group consisting of water, fatty acids, such as oleic acid, tall oil fatty acid, ricinoleic acid, benzoic acid, salicylic acid, stearic acid as well as alkoxylated alcohols, dicarboxylic acids, carboxylic acids, imidazolines, dicyandiamides, ureas, imidazoles, thiols, aliphatic polyamines, cycloaliphatic polyamides, cycloaliphatic dicarboxylic acid anhydrides, imidazoline salts, dicyandamides, phenols and alkylphenols.

16. The method of claim 1, where the secondary liquid precursor comprises a retarder.

17. The method of claim 1, where upon initial mixing of the primary liquid precursor and the secondary liquid precursor, the spherical bead-forming liquid composition is a non-solids bearing homogenous liquid.

18. The method of claim 1, where the mixture has a liquid viscosity from about 20 centipoise (cp) to about 80 cp.

19. The method of claim 1, where the step of allowing the primary liquid precursor and secondary liquid precursor to react to form solid, individual, spherical beads comprises the step of allowing solid, individual, spherical beads of increasingly smaller size to form at increasing distances from the injection well.

* * * * *